(12) United States Patent
Harada

(10) Patent No.: US 10,217,214 B2
(45) Date of Patent: Feb. 26, 2019

(54) RADIOGRAPHIC IMAGE PROCESSING DEVICE, SYSTEM, PROGRAM, AND METHOD TO REDUCE A LOAD OF A PROCESSING OPERATION OF A USER

(71) Applicant: FUJIFILM CORPORATION, Minato-ku, Tokyo (JP)

(72) Inventor: Daiki Harada, Tokyo (JP)

(73) Assignee: FUJIFILM CORPORATION, Tokyo (JP)

( * ) Notice: Subject to any disclaimer, the term of this patent is extended or adjusted under 35 U.S.C. 154(b) by 32 days.

(21) Appl. No.: 15/057,131

(22) Filed: Mar. 1, 2016

(65) Prior Publication Data

US 2016/0180523 A1 Jun. 23, 2016

Related U.S. Application Data

(63) Continuation of application No. PCT/JP2014/075531, filed on Sep. 25, 2014.

(30) Foreign Application Priority Data

Sep. 25, 2013 (JP) .................................. 2013-198552
Sep. 25, 2014 (JP) .................................. 2014-195139

(51) Int. Cl.
   *G06K 9/00* (2006.01)
   *G06T 7/00* (2017.01)

(52) U.S. Cl.
   CPC .. *G06T 7/0012* (2013.01); *G06T 2207/10116* (2013.01)

(58) Field of Classification Search
   None
   See application file for complete search history.

(56) References Cited

U.S. PATENT DOCUMENTS 5,982,953 A * 11/1999 Yanagita ............... G06F 19/321
                                                  348/580
2003/0152258 A1 * 8/2003 Jabri ...................... A61B 6/405
                                                  382/132
(Continued)

FOREIGN PATENT DOCUMENTS

JP    2005-301492 A    10/2005
JP    2006-271800 A    10/2006

OTHER PUBLICATIONS

Extended European Search Report dated Jan. 3, 2017, issued in corresponding EP Patent Application No. EP 14847198.

(Continued)

*Primary Examiner* — Hadi Akhavannik
(74) *Attorney, Agent, or Firm* — Solaris Intellectual Property Group, PLLC

(57) ABSTRACT

The present invention is capable of reducing a load of a processing operation of a user. That is, a console acquires an original image acquired from a radiographic image capturing device. The console performs image analysis process A to generate a purpose A image and performs image analysis process B to generate a purpose B image. The console detects a processing operation performed on the purpose A image by the user and performs image processing to generate the purpose A image, and sets, as handover processing, a processing operation corresponding to a definition of predetermined handover conditions. The console reflects the handover processing in the purpose B image. Further, the console detects a processing operation performed on the purpose B image by the user and performs image processing to generate a purpose B image.

23 Claims, 28 Drawing Sheets

(56) References Cited

U.S. PATENT DOCUMENTS

| | | | | |
|---|---|---|---|---|
| 2003/0223629 A1* | 12/2003 | Inoue | ................... | H04N 5/243 |
| | | | | 382/132 |
| 2008/0025583 A1* | 1/2008 | Jabri | ................. | G06F 19/3406 |
| | | | | 382/128 |
| 2010/0246925 A1* | 9/2010 | Nagatsuka | .............. | A61B 5/08 |
| | | | | 382/132 |
| 2012/0098838 A1* | 4/2012 | Lehmann | ............... | G06T 19/00 |
| | | | | 345/501 |

OTHER PUBLICATIONS

Office Action dated Sep. 6, 2017, issued by the EPO in corresponding EP Patent Application No. EP14847198.0.
Summons to attend oral proceedings, dated Jul. 5, 2018, issued in corresponding EP Patent Application No. 14847198.0.

* cited by examiner

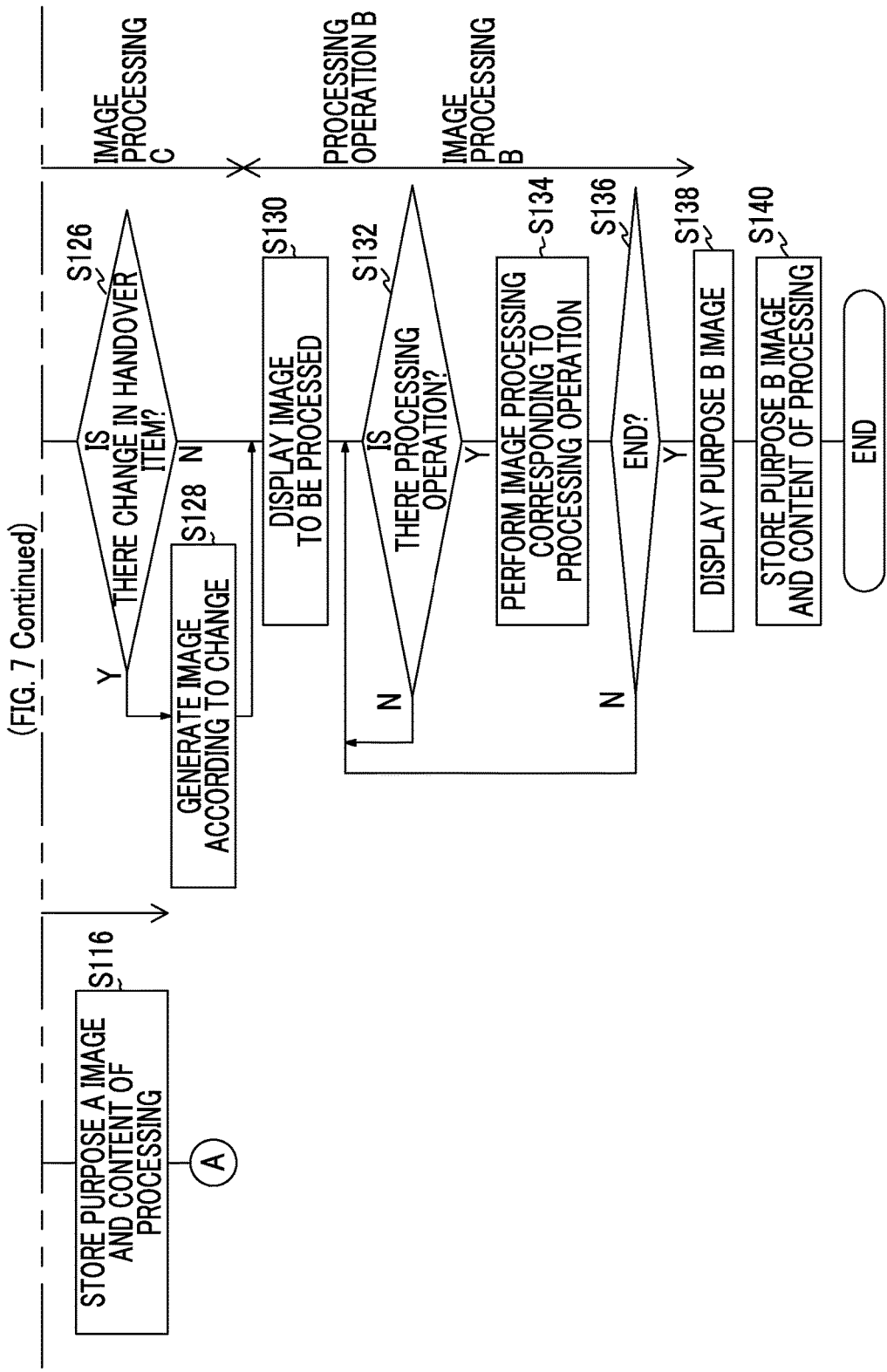

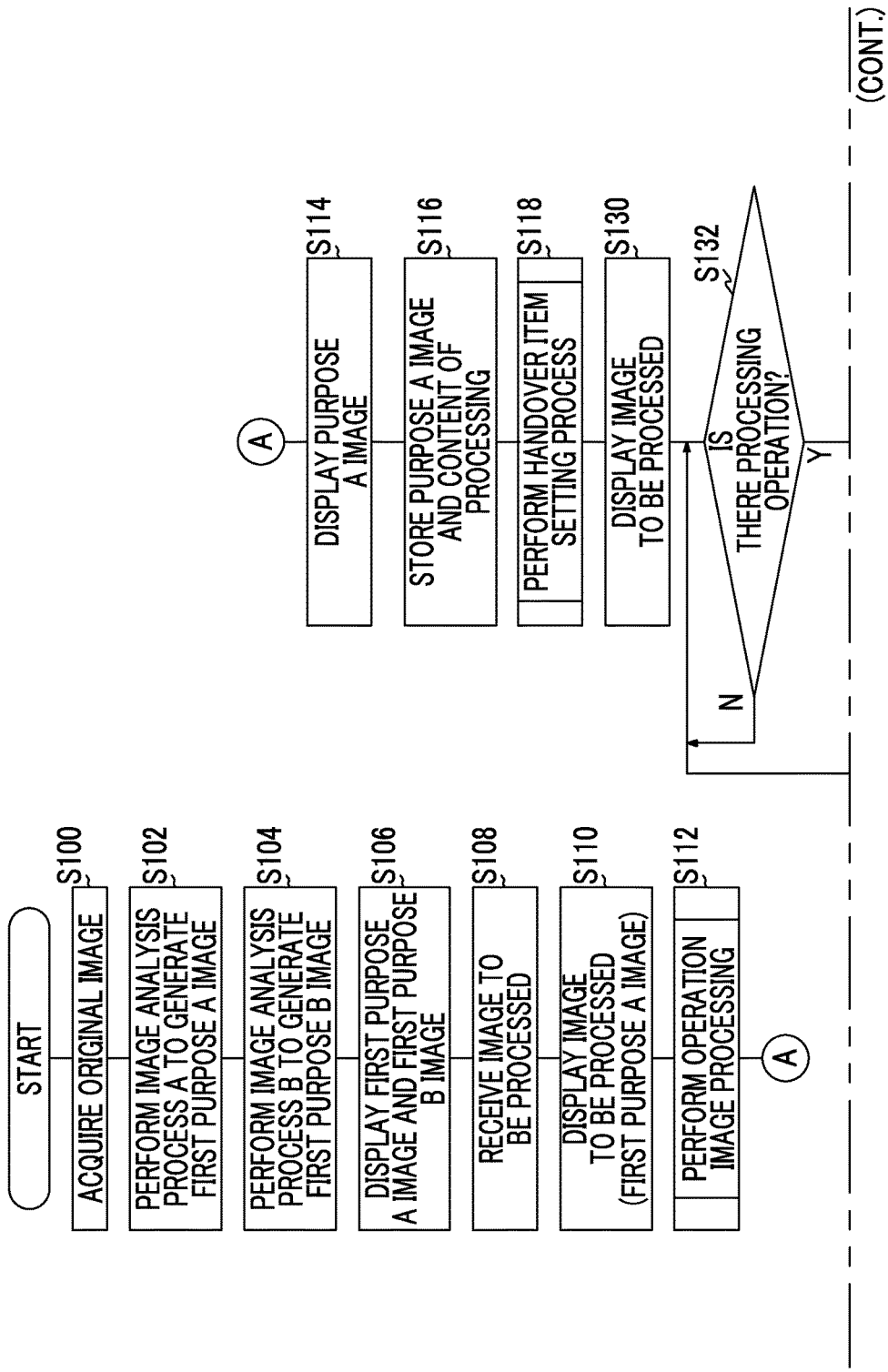

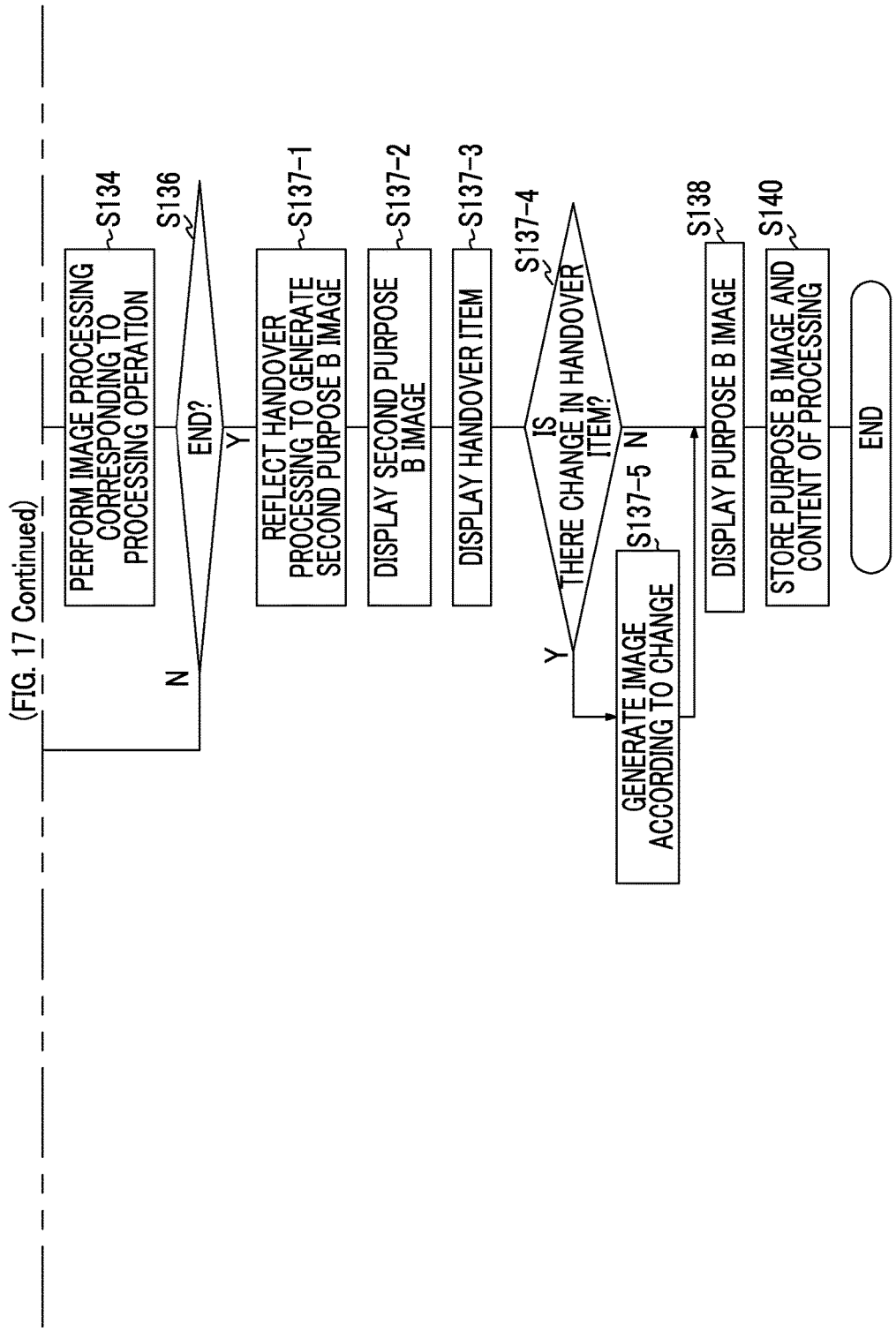

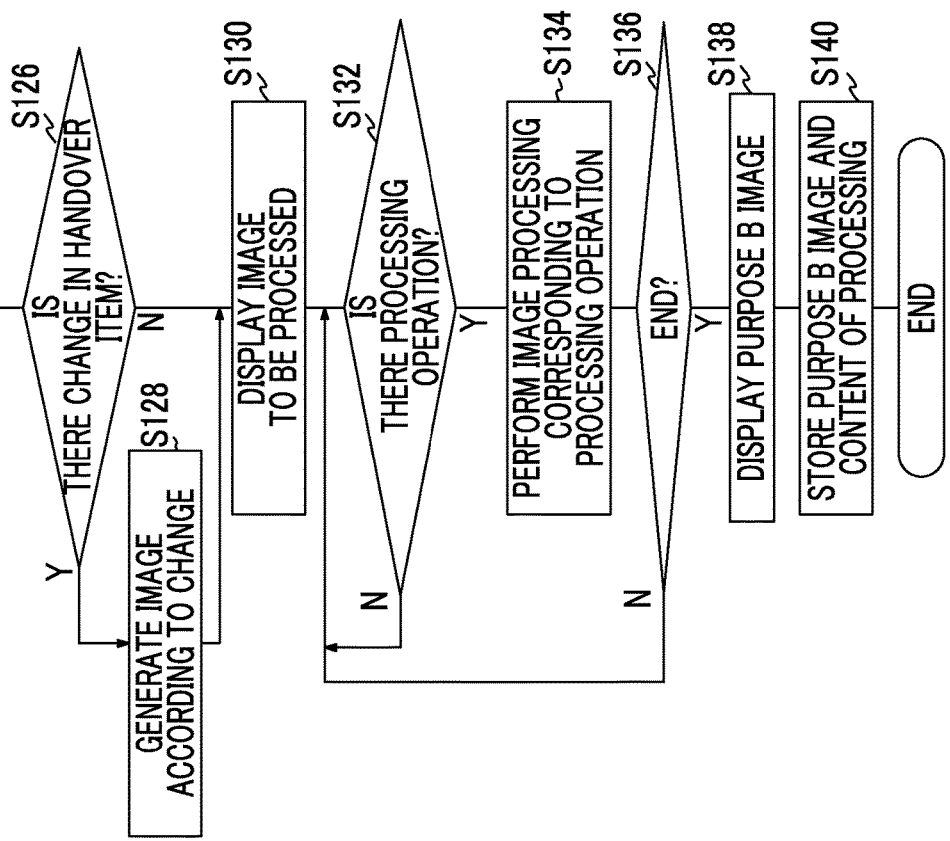

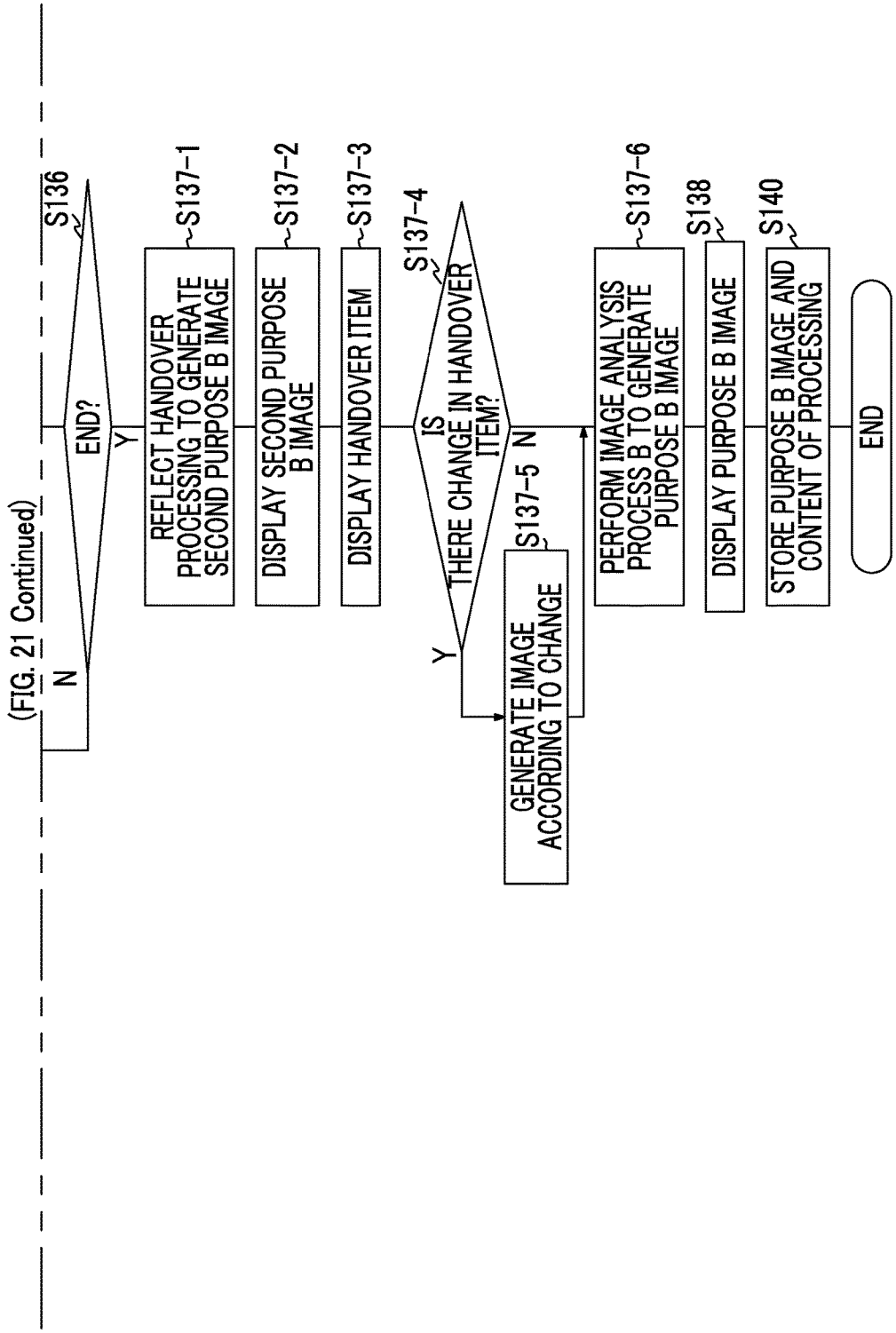

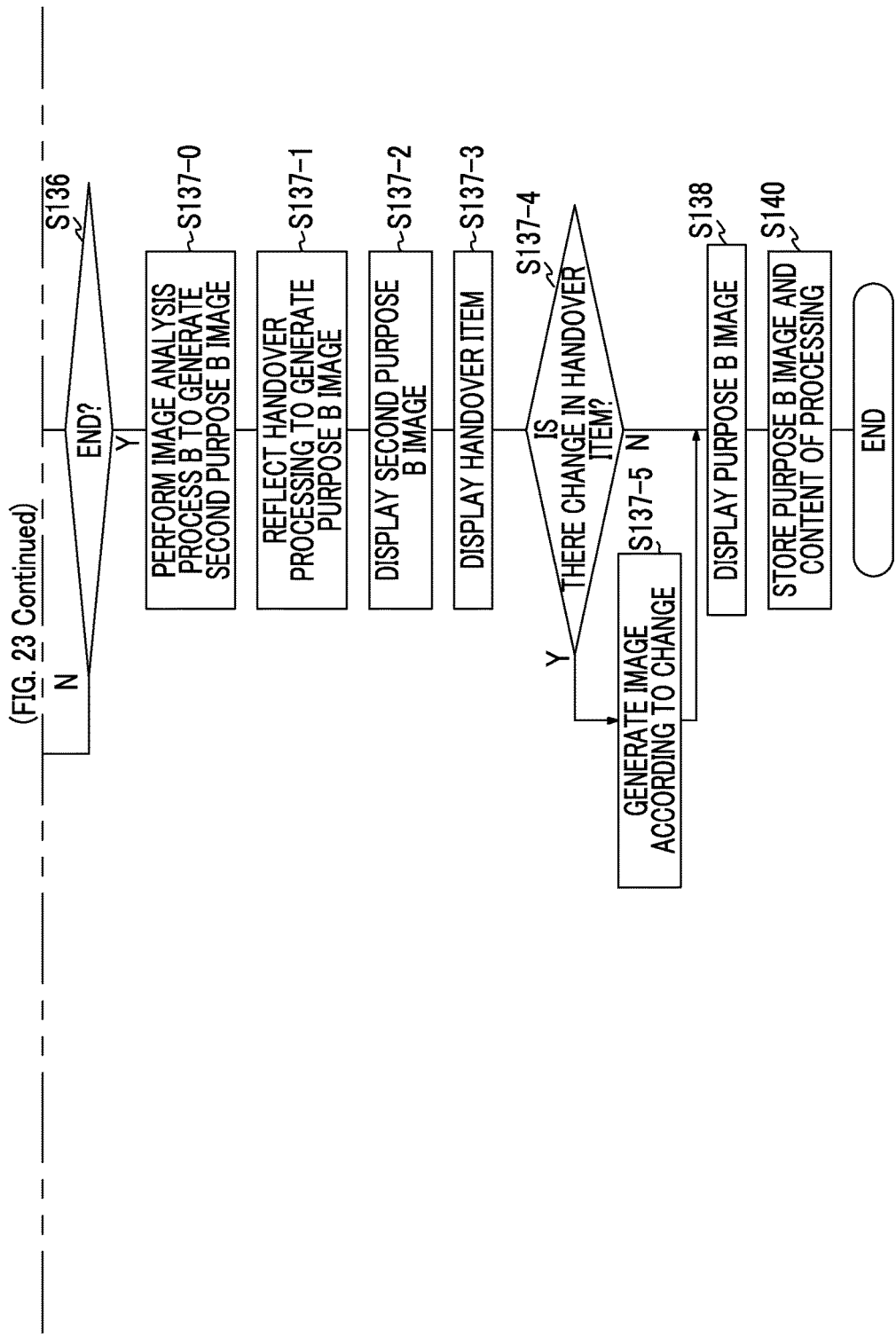

RADIOGRAPHIC IMAGE PROCESSING DEVICE, SYSTEM, PROGRAM, AND METHOD TO REDUCE A LOAD OF A PROCESSING OPERATION OF A USER

CROSS-REFERENCE TO RELATED APPLICATIONS

This application is a continuation application of International Application No. PCT/JP2014/075531, filed on Sep. 25, 2014, which is incorporated herein by reference in its entirety. Further, this application claims priority from Japanese Patent Application No. 2013-198552, filed on Sep. 25, 2013, and Japanese Patent Application No. 2014-195139, filed on Sep. 25, 2014, the disclosures of which are incorporated by reference herein in their entireties.

BACKGROUND

Technical Field

The present invention relates to an image processing device, an image processing system, an image processing program, and an image processing method. Particularly, the present invention relates to an image processing device, an image processing system, an image processing program, and an image processing method that are used for image processing of a radiographic image.

Related Art

In recent years, a radiographic image captured by a radiographic image capturing device is often used for examination, diagnosis, medical examination, or the like, and a load on a user who is a doctor, a technician, or the like who interprets the radiographic image is increasing. Further, the user generally performs image processing on the radiographic image, and an image processing load is increasing.

As technology for reducing a load of image processing, for example, image processing history acquisition technology capable of simply performing image processing again by displaying an image processing operation history is described in JP2005-301492A. Further, for example, technology for improving interpretation efficiency by displaying an image obtained by applying different image processing conditions to a selected image is described in JP2006-271800A.

In recent years, capturing and acquiring plural radiographic images having different purposes for one subject (for example, an imaging portion of the subject) have been performed. In a case in which respective image processing is performed on the plural radiographic images, a load of processing operations performed by a user for performing of the image processing further increases. However, in technologies described in JP2005-301492A and JP2006-271800A, it is difficult for a load of processing operations for the plural radiographic images having different purposes to be reduced.

SUMMARY

The present invention provides an image processing device, an image processing system, an image processing program, and an image processing method capable of reducing a load of a processing operation of a user.

An image processing device of the present invention is an image processing device that generates plural different images subjected to different image processing from an original image which is a radiographic image, the image processing device including: a first generation unit that receives one or more processing operations for the original image and performs first image processing corresponding to the received processing operation on the original image to generate a first image; and a second generation unit that reflects handover processing selected from among the received processing operations in the original image, and then, performs second image processing different from the first image processing to generate a second image, or performs the second image processing on the original image, and then, reflects the handover processing to generate the second image.

An image processing device of the present invention includes: a first generation unit that performs a first image analysis process on an original image which is a radiographic image to generate a first image; an image processing unit that receives one or more processing operations for the first image generated by the first generation unit, and performs image processing corresponding to the received processing operation on the first image; and a second generation unit that performs a second image analysis process different from the first image analysis process on the original image to generate a second image, and reflects handover processing selected from among the processing operations in the original image before the second image which is a handover destination is generated, or in the second image.

Further, the image processing device of the present invention may further include a handover processing setting unit that sets whether or not the processing operation is set as handover processing, and the second generation unit may select the processing operation set by the handover processing setting unit as the handover processing.

Further, the image processing device of the present invention may further include a display control unit that displays the handover processing on a display unit, and the second generation unit may include an instruction reception unit that receives an instruction performed according to information indicating the handover processing displayed on the display unit by the display control unit, and may reflect the handover processing according to the instruction received by the instruction reception unit in a handover destination.

Further, in the image processing device of the present invention, the display control unit may display only the processing operation selected as the handover processing by the second generation unit among the processing operations on the display unit.

Further, in the image processing device of the present invention, the display control unit may display, on the display unit, a display to set the processing operation not selected by the second generation unit among the processing operations as the handover processing.

Further, the image processing device of the present invention may further include an operation detection unit that detects at least one of operating time, an amount of operation, or the number of operations, in which the processing operation is performed for each processing operation, and the second generation unit may select, as the handover processing, a processing operation for which at least one of the operating time, the amount of operation, or the number of operations, detected by the operation detection unit is equal to or greater than a predetermined threshold value.

Further, in the image processing device of the present invention, in a case in which there are plural types of processing operations, the operation detection unit may sum at least one of the detected operation time, the detected amount of operation, or the detected number of operations, for each type.

An image processing device of the present invention includes a generation unit that acquires an original image which is a radiographic image and performs image processing having different processing conditions to generate a first image and a second image; a first image processing unit that receives a processing operation for the first image generated by the generation unit and performs image processing corresponding to the received processing operation on one image; a reflecting unit that reflects handover processing selected from among the processing operations received by the first image processing unit and handed over for the second image, in the second image which is a handover destination; and a second image processing unit that receives a processing operation for the second image in which the handover processing is reflected by the reflecting unit and performs second image processing corresponding to the received processing operation on the second image.

An image processing device of the present invention includes a generation unit that acquires an original image which is a radiographic image and performs image processing having different processing conditions to generate a first image and a second image; a first image processing unit that receives a processing operation for the first image generated by the generation unit and performs first image processing corresponding to the received processing operation on the first image; a second image processing unit that receives a processing operation for the second image and performs second image processing corresponding to the received processing operation on the second image; and a reflecting unit that reflects handover processing selected from among the processing operations received by the first image processing unit and handed over for the second image, in the second image subjected to the second image processing by the second image processing unit.

An image processing device of the present invention includes a first generation unit that acquires an original image which is a radiographic image and performs a first image analysis process to generate a first image; a first image processing unit that receives a processing operation for the first image generated by the first generation unit and performs first image processing corresponding to the received processing operation on the first image; a reflecting unit that reflects, in the original image, handover processing selected from among the processing operations received by the first image processing unit and handed over for the original image; a second generation unit that performs a second image analysis process on the original image in which the handover processing is reflected by the reflecting unit to generate a second image; and a second image processing unit that receives a processing operation for the second image and performs second image processing corresponding to the received processing operation on the second image.

An image processing device of the present invention includes a first generation unit that acquires an original image which is a radiographic image and performs a first image analysis process to generate a first image; a first image processing unit that receives a processing operation for the first image generated by the first generation unit and performs first image processing corresponding to the received processing operation on the first image; a second image processing unit that receives a processing operation for the second image and performs second image processing corresponding to the received processing operation on the original image; a reflecting unit that selects handover processing to be handed over for the original image from among the processing operations received by the first image processing unit, and reflects the selected handover processing in the original image subjected to the second image processing by the second image processing unit; and a second generation unit that performs a second image analysis process on the original image in which the handover processing is reflected by the reflecting unit, to generate the second image.

An image processing device of the present invention includes a first generation unit that acquires an original image which is a radiographic image and performs first image processing to generate a first image; a first image processing unit that receives a processing operation for the first image generated by the first generation unit and performs first image processing corresponding to the received processing operation on the first image; a second image processing unit that receives a processing operation for the second image and performs second image processing corresponding to the received processing operation on the original image; a second generation unit that performs a second image analysis process on the original image subjected to the second image processing by the second image processing unit to generate the second image; and a reflecting unit that selects handover processing to be handed over for the second image from among the processing operations received by the first image processing unit, and reflects the selected handover processing in the second image generated by the second generation unit.

An image processing system of the present invention includes the image processing device of the present invention; a display unit that displays an image subjected to image processing by the image processing device; and an operation unit that performs a processing operation for the image processing device.

An image processing program causes a computer to function as each unit of the image processing device of the present invention.

An image processing method of the present invention is an image processing method of an image processing device that generates plural different images subjected to different image processing from an original image which is a radiographic image, the image processing method including: causing a first generation unit to receive one or more processing operations for the original image and perform first image processing corresponding to the received processing operation on the original image to generate a first image; and causing a second generation unit to reflect handover processing selected from among the processing operations in the original image, and then, to perform second image processing different from the first image processing to generate a second image, or to perform the second image processing on the original image, and then, reflect the handover processing to generate the second image.

An image processing method of the present invention includes: causing a first generation unit to perform a first image analysis process on an original image which is a radiographic image to generate a first image; causing an image processing unit to receive one or more processing operations for the first image generated by the first generation unit, and perform image processing corresponding to the received processing operation on the first image; and causing a second generation unit to perform a second image analysis process different from the first image analysis process on the original image to generate a second image, and to reflect handover processing selected from among the processing operations in the original image before the second image which is a handover destination is generated, or in the second image.

According to the present invention, it is possible to reduce a load of the processing operations of a user.

BRIEF DESCRIPTION OF THE DRAWINGS

FIG. 17 is a flowchart of an example of image processing executed by a control unit of the console of the second embodiment.

DESCRIPTION OF EMBODIMENTS

Hereinafter, an example of this embodiment will be described with reference to the respective drawings.

First Embodiment

Figure 1:
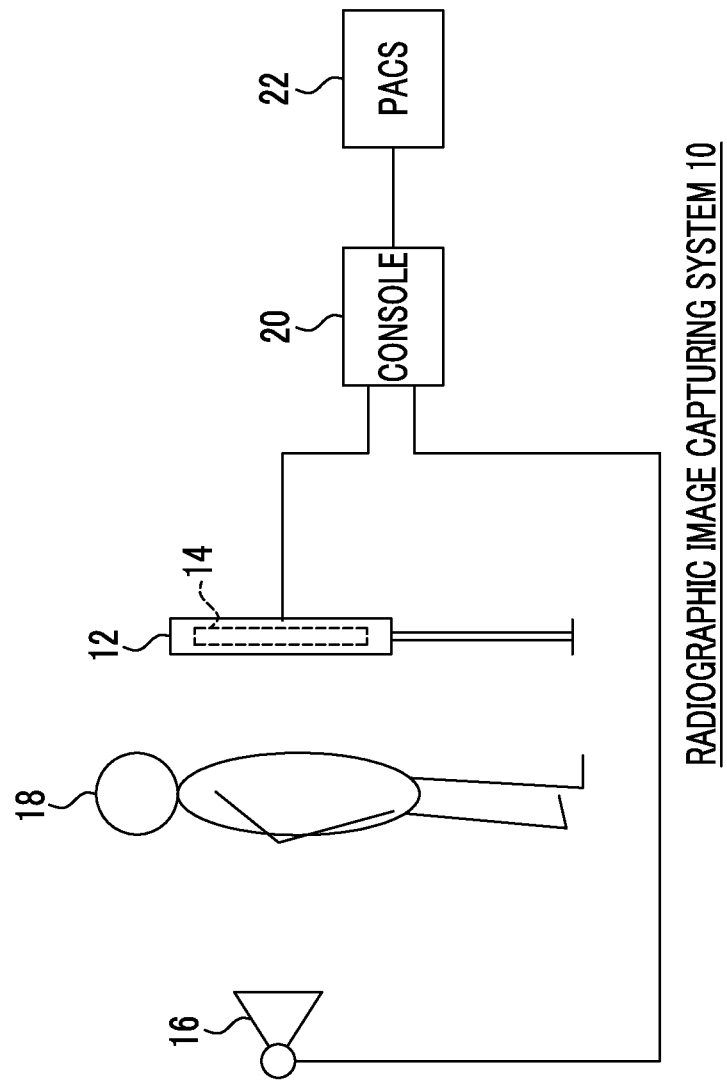
FIG. 1 is a schematic configuration diagram illustrating a schematic configuration of an example of a radiographic image capturing system according to a first embodiment.

First, a schematic configuration of a radiographic image capturing system that performs image processing of a radiographic image using a console functioning as an image processing device of this embodiment will be described. FIG. 1 is a schematic configuration diagram of an example of a radiographic image capturing system according to this embodiment.

A radiographic image capturing system 10 includes a radiographic image capturing device 12, a radiation irradiation device 16, and a console 20. The console 20, the radiographic image capturing device 12, and the radiation irradiation device 16 are connected to each other either wiredly or wirelessly.

The radiation irradiation device 16 has a function of irradiating a subject 18 with a radiation (for example, X-ray). The radiographic image capturing device 12 includes a radiation detector 14 that detects the radiation radiated from the radiation irradiation device 16 and transmitted through the subject 18. The radiation detector 14 of this embodiment is not particularly limited. For example, the radiation detector 14 may be a radiation detector of an indirect conversion type that converts light obtained by converting the radiation to charge. Further, the radiation detector 14 may be, for example, a radiation detector of a direct conversion type that directly converts the radiation to charge.

The console 20 has a function of performing capturing of the radiographic image according to an operation of a user who is a doctor or a radiological technician based on an instruction (imaging menu) input from an external system (for example, radiology information system (RIS)). Further, the console 20 in this embodiment has a function of acquiring the radiographic image from the radiographic image capturing device 12 and outputting the radiographic image to a picture archiving and communication system (PACS) 22.

When capturing of the radiographic image is performed, the radiation detector 14 of the radiographic image capturing device 12 is irradiated with the radiation carrying image information by being radiated from the radiation irradiation device 16 and transmitted through the subject 18 located in an imaging position according to a timing based on the control of the console 20. The radiographic image capturing device 12 detects the radiation radiated by the radiation detector 14, generates a radiographic image according to the detected radiation, and outputs the radiographic image to the console 20. The captured radiographic image is output from the console 20 to the PACS 22 which is an example of the image processing system, and managed by the PACS 22.

The image processing device of this embodiment includes the console 20, and has a function of performing image processing of a radiographic image. Hereinafter, in a case in which plural types of images such as an "original image (will be described below in detail)" or an "purpose A image (will be described below in detail)" may be collectively referred to a "radiographic image" since the images are images based on radiated radiation.

Figure 2:
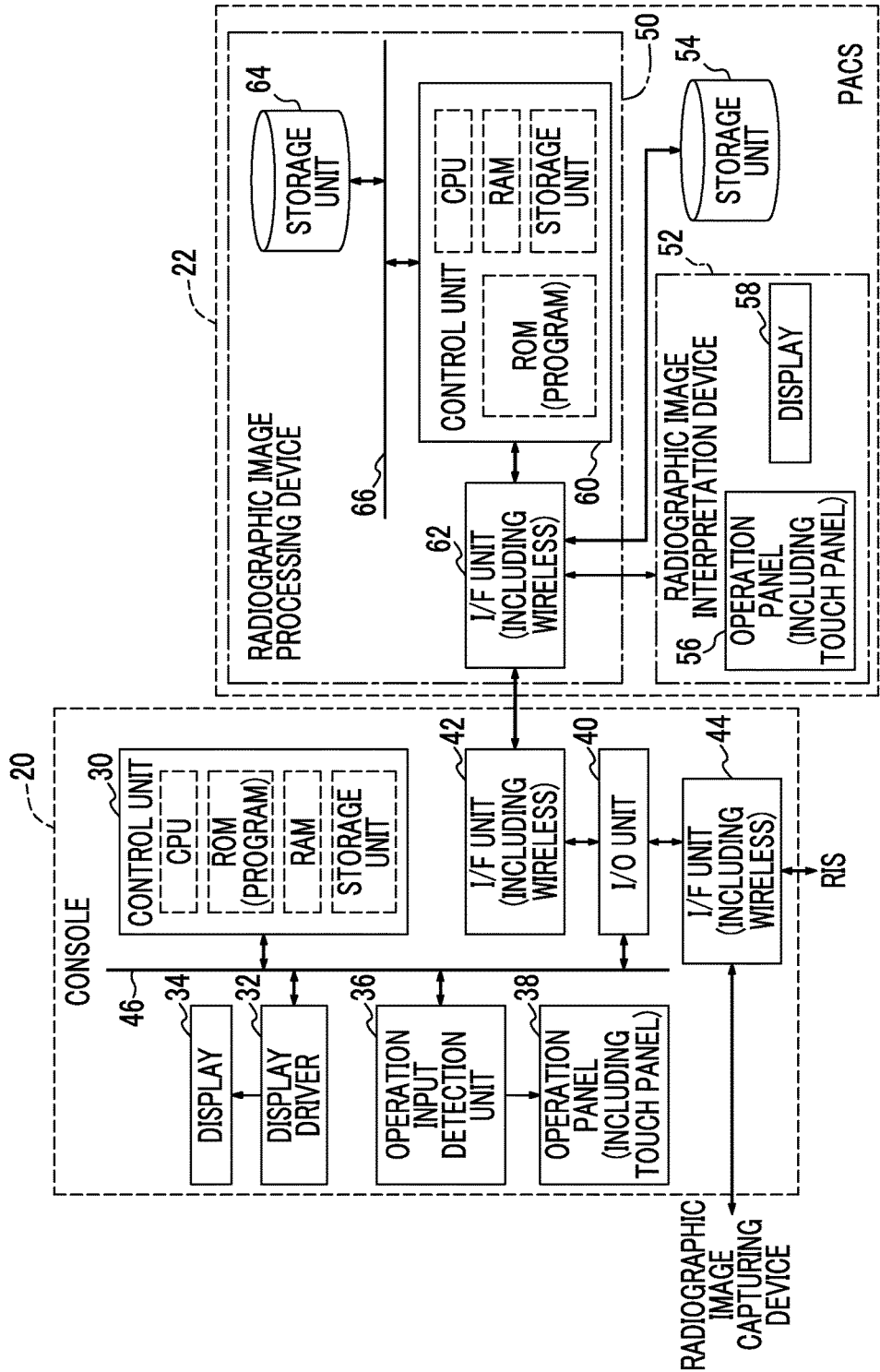
FIG. 2 is a schematic configuration diagram of an example of a console and a PACS according to the first embodiment.

FIG. 2 is an example of a schematic configuration diagram of the console 20 for describing an image processing function. The image processing device may be included in the PACS 22. Further, "image processing" in this embodiment includes conversion of image quality, rotation, inversion, marker superimposition, comment writing, and the like, and refers to all processing performed on images (various images including a radiographic image).

The console 20 in this embodiment is configured as a server computer, and includes a control unit 30, a display driver 32, a display 34, an operation input detection unit 36, an operation panel 38, an input output (I/O) unit 40, an interface (I/F) unit 42, and an I/F unit 44.

The control unit 30 has a function of controlling an entire operation of the console 20, and includes a central processing unit (CPU), a read only memory (ROM), and a random access memory (RAM), and a storage unit. The CPU has a function of controlling an entire operation of the console 20. For example, various programs including an image processing program used by the CPU are stored in the ROM in advance. The RAM has a function of temporarily storing various data. The storage unit is, for example, a hard disk drive (HDD), and has a function of storing and holding various data. The storage unit has a function of storing, for example, a definition of a type of processing operations to be described below in detail or a definition of handover conditions. Further, the console 20 has a function of performing image processing on various images.

The display driver 32 has a function of controlling display of various information on the display 34. The display 34 of this embodiment has a function of displaying an imaging menu, a captured radiographic image, or the like. The operation input detection unit 36 has a function of detecting an operation state or a processing operation for the operation panel 38. The operation panel 38 is used for the user to input a processing operation relating to capturing of the radiographic image or image processing of the captured radiographic images. In this embodiment, the operation panel 38 includes, for example, a touch panel, a touch pen, plural keys, and a mouse. In a case in which the operation panel 38 is a touch panel, the operation panel 38 may be the same as the display 34.

Further, the I/O unit 40 and the I/F unit 42 have a function of transmitting and receiving various information to and from a radiographic image processing device 50 of the PACS 22 through wireless communication or the like. Further, the I/F unit 44 has a function of transmitting and receiving various information between the radiographic image capturing device 12 and the RIS.

The control unit 30, the display driver 32, the operation input detection unit 36, and the I/O unit 40 are connected to each other such that exchange of information can be performed via a bus 46, such as a system bus or a control bus. Accordingly, the control unit 30 can perform control of display of various information on the display 34 via the display driver 32 and control of transmission and reception of various information to and from the PACS 22 via the I/F unit 42.

The PACS 22 of this embodiment includes the radiographic image processing device 50, a radiographic image interpretation device 52, and a storage unit 54.

The radiographic image processing device 50 of this embodiment has a function of controlling storage in the storage unit 54 of the radiographic image received from the radiographic image capturing device 12 based on an instruction from the console 20. The radiographic image processing device 50 controls display of various images on the radiographic image interpretation device 52.

The radiographic image processing device 50 of this embodiment includes a control unit 60, an I/F unit 62, and a storage unit 64.

The control unit 60 has a function of controlling the entire PACS 22. The control unit 60 includes a CPU, a ROM, a RAM, and a storage unit. The CPU has a function of controlling an operation of the PACS 22. Various programs or the like used by the CPU are stored in the ROM in advance. The RAM has a function of temporarily storing various data. The storage unit is an HDD or the like, and has a function of storing and holding various data.

The storage unit 64 has a function of storing the radiographic image output from the console 20. An example of the storage unit 64 includes an HDD.

The I/F unit 62 has a function of transmitting and receiving various information to and from the console 20 through wireless communication or the like.

The control unit 60 and the storage unit 64 are connected so that the control unit 60 and the storage unit 64 can exchange information with each other via a bus 66 such as a system bus or a control bus.

The storage unit 54 of this embodiment has a function of storing the radiographic image, various images subjected to image processing by the radiographic image processing device 50, and information related to various images. An example of the storage unit 54 may include an HDD.

Further, the radiographic image interpretation device 52 of this embodiment is a device having a function of enabling a radiologist to interpret the radiographic image or various images subjected to image processing by the radiographic image processing device 50, and is not particularly limited. The radiographic image interpretation device may include an interpretation viewer or a console, a tablet terminal, and the like. The radiographic image interpretation device 52 of this embodiment is a personal computer. The radiographic image interpretation device 85 includes a CPU, a ROM, a RAM, a storage unit, a display driver, a display 58, an operation input detection unit, an operation panel 56, an I/O unit, and an I/F unit, similar to the console 20 or the radiographic image processing device 50. In FIG. 2, in order to avoid complication of the description, only the display 58 and the operation panel 56 in the above configuration are illustrated and other descriptions are omitted.

In the radiographic image capturing system 10 of this embodiment, it is possible to acquire plural radiographic images having different purposes through one imaging. In this embodiment, "one imaging" refers to one (a series of) imaging set by an imaging menu or the user, and the number of radiographic images to be captured may be one or plural. Further, in this embodiment, "one imaging" may be for any one of a still image and a moving image. Hereinafter, capturing the plural radiographic images having different purposes through one imaging is referred to as "multi-purpose imaging."

In this embodiment, the "plural images having different purposes" are not particularly limited, and refer to radiographic images for examination purpose or radiographic images used for a radiologist such as a doctor to perform different medical examination and diagnosis. For example, the plural images having different purposes may include a radiographic image obtained through general chest radiography in health diagnosis, and a radiographic image for pneumoconiosis examination. Further, for example, the plural images having different purposes include a normal radiographic image for general medical examination, and an image for special purpose. The image for special purpose may include an image for confirmation of artifacts, a catheter-enhanced image, and a gauze-enhanced image, and the like, and is not particularly limited.

In a case in which the multi-purpose imaging is instructed by the imaging menu or the user, the console 20 in this embodiment uses the radiographic image obtained by one imaging as an original image and performs different image processing on the original image to generate plural radiographic images having different purposes. In this embodiment, the "original image" refers to a radiographic image subjected to image processing determined to be uniformly performed on all radiographic images regardless of purposes, for the radiographic images captured by the radiographic image capturing device 12.

Plural radiographic images having different purposes generated by multi-purpose imaging, an original image of the multi-purpose imaging, and a radiographic image generated by imaging that is not the multi-purpose imaging (imaging in a case in which one type of radiographic image is generated from images obtained by one imaging) may not be discriminated based on appearance of the radiographic image. In this embodiment, an identifier for distinguishing between both of the images is associated with each radiographic image (including the original image) and displayed on the display 34 according to a setting or the desire of the user. The identifier is not particularly limited as long as the user can recognize how the radiographic image has been captured and what image the radiographic image is, and may be any one of may be a mark, a number, and a name.

Hereinafter, image processing in multi-purpose capturing of the console 20 in this embodiment will be described with reference to the drawings. Hereinafter, a case in which a general image for chest radiography (purpose A image) and an image for pneumoconiosis examination (purpose B image) are generated through multi-purpose imaging will be described as a specific example.

First, a basic form of image processing in multi-purpose imaging of the console 20 will be described.

Figure 3:
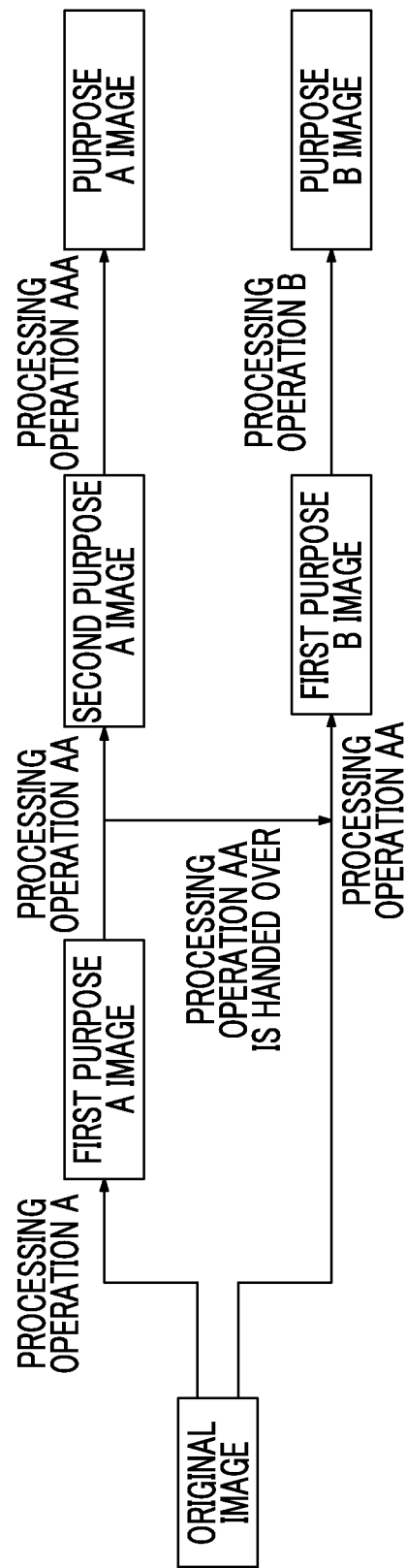
FIG. 3 is an illustrative diagram illustrating an example of a flow of image processing (processing operation) in the console according to a basic form of the first embodiment.
Figure 4:
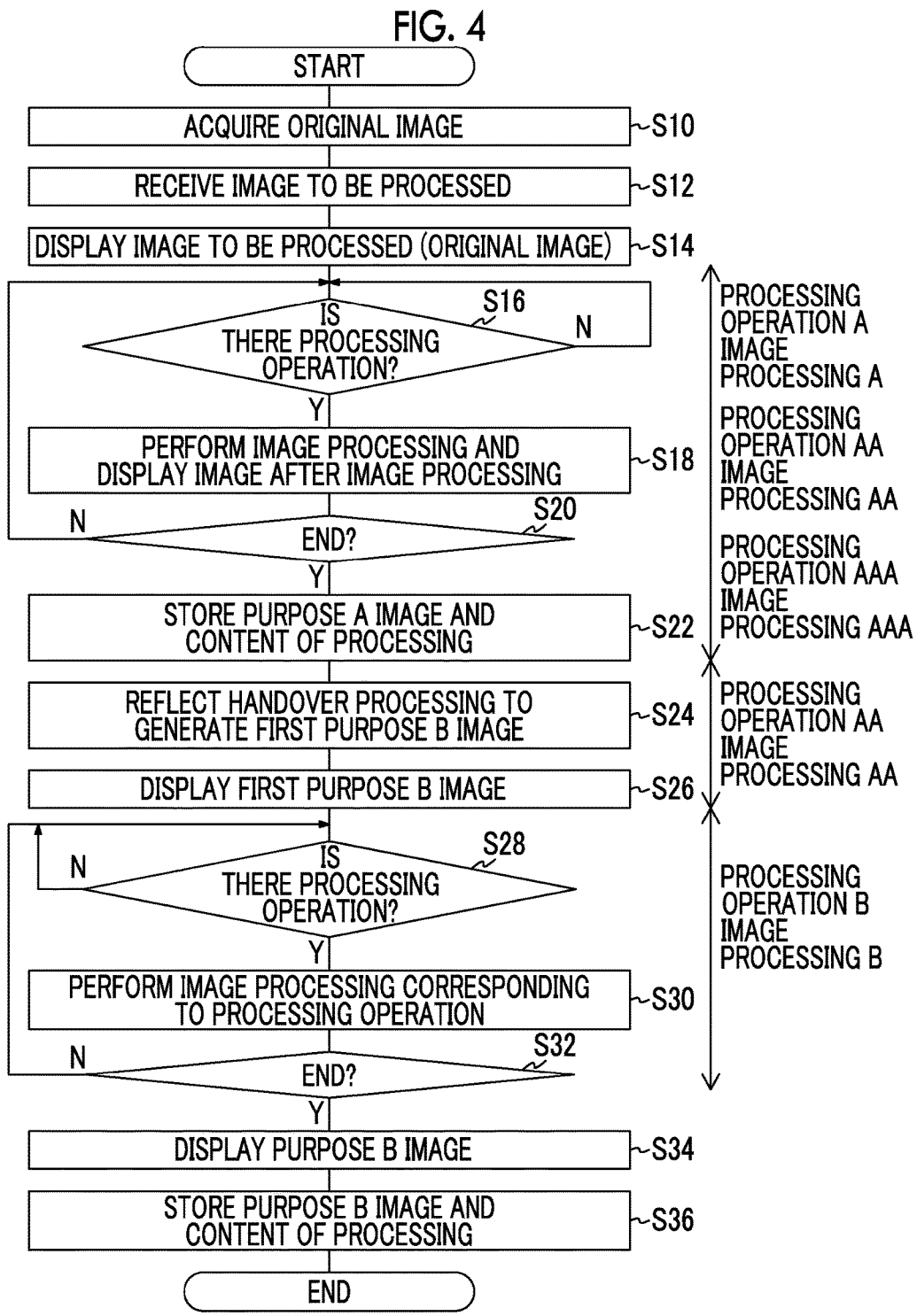
FIG. 4 is a flowchart of an example of image processing executed by a control unit of the console according to the basic form of the first embodiment.

FIG. 3 illustrates an example of a flow of image processing (processing operation) according to a basic form of the console 20 in this embodiment. Further, FIG. 4 illustrates a flowchart of an example of image processing executed by the control unit 30 of the console 20 in this embodiment. In the console 20 in this embodiment, the control unit 30 executes the image processing program stored in the ROM, and accordingly, functions as each unit of the present invention to execute image processing illustrated in FIG. 4.

In this embodiment, a case in which the user performs a processing operation using the operation panel 38 of the console 20 will be described. In the image processing below, the console 20 displays various images on the display 34.

In step S10, the control unit 30 acquires an original image. In this embodiment, the control unit 30 acquires the radiographic image captured by the radiation detector 14 as the original image from the radiographic image capturing device 12.

Then, in step S12, the control unit 30 receives the image to be processed, which is selected by the user. Specifically, in this embodiment, the control unit 30 receives a processing operation performed by the user for any one of the purpose A image and the purpose B image. In a case in which the processing operation performed by the user for any one of the purpose A image and the purpose B image is determined in advance, the process of step S12 may be omitted.

Then, in step S14, the control unit 30 displays the image to be processed (original image) on the display 34. The "image to be processed" refers to an image which is a target of the processing operation performed by the user. In this step, the image to be processed refers to the original image. In this embodiment, various displays enabling the user to perform the processing operation together with the display of the image to be processed are performed on the display 34. Hereinafter, a case in which the user performs the processing operation on the original image which is the image to be processed to generate a purpose A image for convenience of description will be described.

The user performs plural processing operations to generate the purpose A image, but performs two types of processing operations, including a processing operation for only purpose A, and a processing operation handed over and reflected for generation of the purpose B image.

Then, in step S16, the control unit 30 determines whether there is a processing operation. The control unit 30 is in a standby state until there is a processing operation. On the other hand, for example, in a case in which the operation input detection unit 36 detects the processing operation, the control unit 30 proceeds to step S18.

In step S18, the control unit 30 performs image processing according to the processing operation detected by the operation input detection unit 36, and displays an image after image processing on the display 34.

In step S20, the control unit 30 determines whether the processing operation ends. In a case in which the processing operation does not end, the control unit 30 returns to step S16 and repeats the process. On the other hand, in a case in which the processing operation ends, the control unit 30 proceeds to step S22.

In the specific example illustrated in FIG. 3, the user performs three types of processing operations A, AA, and AAA on the original image in order to generate the purpose A image. Therefore, the control unit 30 performs image processing A on the original image according to processing operation A to generate a first purpose A image, and displays the first purpose A image on the display 34. Further, the control unit 30 performs image processing AA on the first purpose A image according to processing operation AA to generate a second purpose A image, and displays the second purpose A image on the display 34. Further, the control unit 30 performs image processing AAA on the second purpose A image according to processing operation AAA to generate a purpose A image, and displays the purpose A image on the display 34. Therefore, in a case in which the determination in step S20 is yes, the purpose A image is displayed on the display 34.

In step S22, the control unit 30 stores image information of the purpose A image, and content of the image processing A, AA, and AAA performed for generation of the purpose A image in a storage unit of the control unit 30 in association with each other.

Then, in step S24, the control unit 30 reflects a processing operation (handover process) set in the handover item in the original image to generate a first purpose B image. In the specific example illustrated in FIG. 3, processing operation AA is handed over for the original image in order to generate the purpose B image. Therefore, the control unit 30 reflects processing operation AA in the original image to generate the first purpose B image.

Then, in step S26, the control unit 30 displays the first purpose B image on the display 34.

Then, in step S28, the control unit 30 determines whether or not there is a processing operation. In a case in which there is no processing operation, the control unit 30 becomes the standby state. On the other hand, in a case in which there is a processing operation, the control unit 30 proceeds to step S30, and performs image processing corresponding to the processing operation.

Then, in step S32, the control unit 30 determines whether the processing operation ends. In a case in which the processing operation does not end, the control unit 30 returns to step S28 and repeats the processing operation. On the other hand, in a case in which the processing operation ends, the control unit 30 proceeds to step S34. In the specific example illustrated in FIG. 3, the user performs processing operation B on the first purpose B image to generate the purpose B image. Therefore, the control unit 30 performs image processing B on the first purpose B image according to processing operation B to generate the purpose B image.

In step S34, the control unit 30 displays the purpose B image on the display 34. Then, in step S36, the control unit 30 stores image information of the purpose B image and content of the image processing (processing operation AA and processing operation B) performed for generation of the purpose B image in the storage unit of the control unit 30 in association with each other, and then, ends the image processing. In a case in which respective output destinations of the purpose A image and the purpose B image generated through the image processing are determined in advance or designated by the user, the purpose A image and the purpose B image may be output to the respective output destinations (for example, the radiographic image processing device 50 or the radiographic image interpretation device 52 of the PACS 22).

While AA among the processing operations performed by the user to generate the purpose A image is handed over as a processing operation for generating the purpose B image in the above basic form, a handover processing operation is not limited. The handover processing operation may be processing operation A or may be processing operation AAA.

While image processing AA corresponding to processing operation AA is performed and then, image processing B corresponding to processing operation B is performed as image processing for generating the purpose B image in the above basic form, an order of the image processing (processing operation) is not limited thereto.

Figure 5:
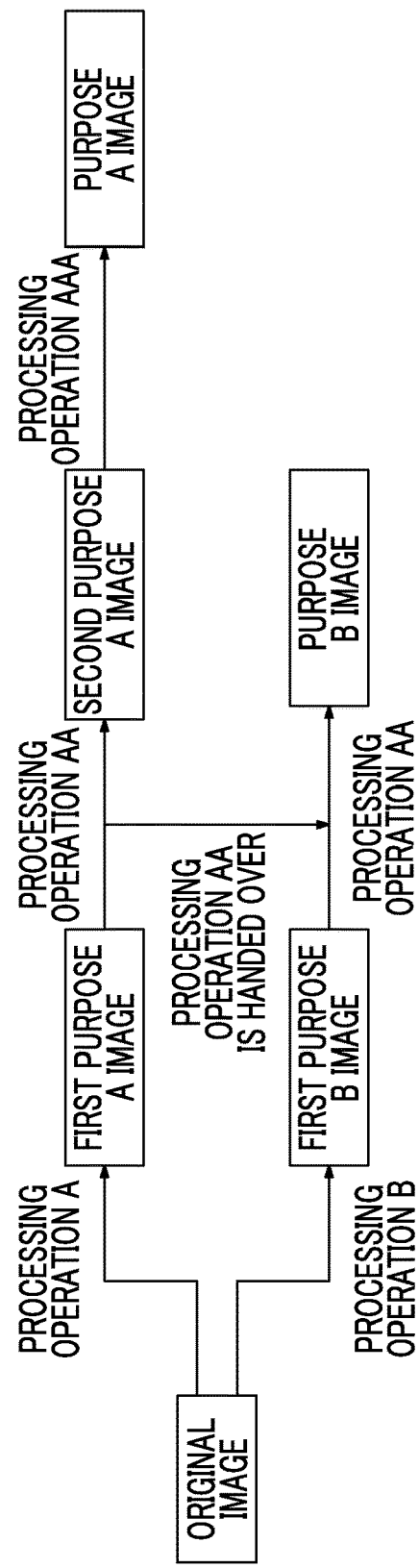
FIG. 5 is an illustrative diagram illustrating another example of a flow of the image processing (processing operation) in the console according to the basic form of the first embodiment.

FIG. 5 illustrates another example of a flow of image processing (processing operation) according to the basic form of the console 20 in this embodiment. In a case illustrated in FIG. 5, first, the control unit 30 performs image processing corresponding to processing operation B described above on the original image to generate a first purpose B image. Then, the control unit 30 performs image processing AA according to processing operation AA handed over from the processing operation for generating the purpose A image on the first purpose B image to generate the purpose B image. In a flow of the image processing performed by the control unit 30 in this case, for example, step S24 of the image processing illustrated in FIG. 4 may be interchanged with steps 28 to S32.

Thus, in the basic form of this embodiment, the control unit 30 of the console 20 performs image processing corresponding to the processing operation of the user on the original image to generate an image for one purpose (in the specific example, the purpose A image). The control unit 30 hands over the processing operations for generating the image for one purpose as processing operations for generating the image for the other purpose (in the specific example, the purpose B image), reflects the handover processing operation, and performs the image processing. Further, the control unit 30 performs image processing corresponding to the processing operation performed by the user in order to generate the image for the other purpose, and generates the image for the other purpose.

Figure 6:
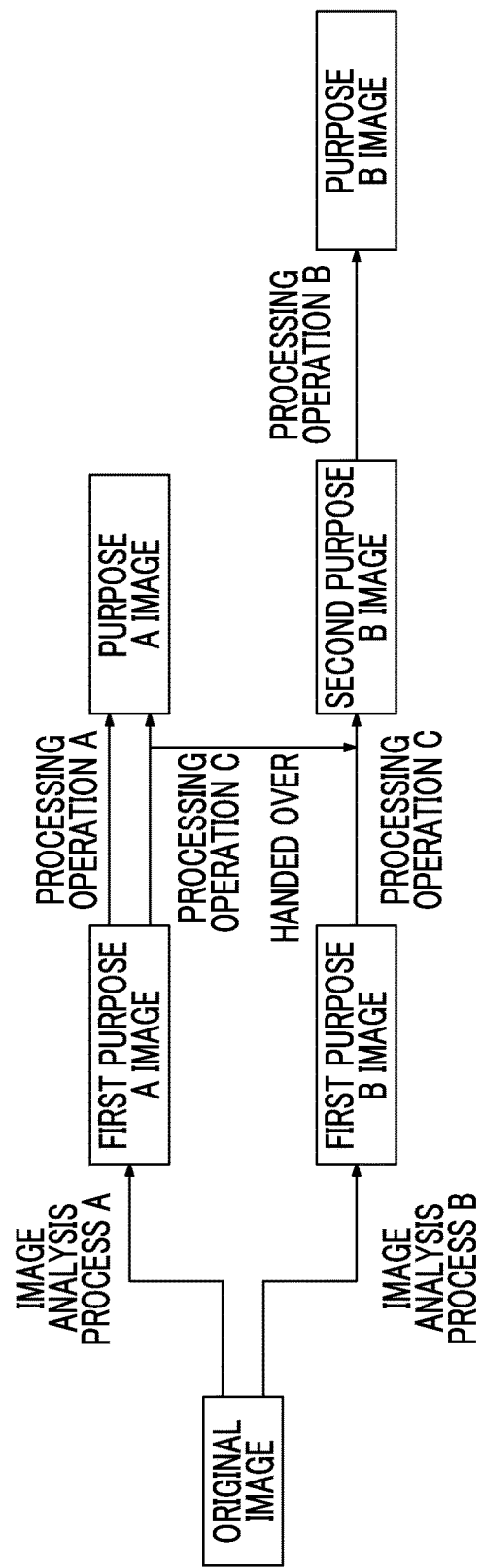
FIG. 6 is an illustrative diagram illustrating an example of a flow of image processing (processing operation) in a console according to an application form of the first embodiment.
Figure 7:
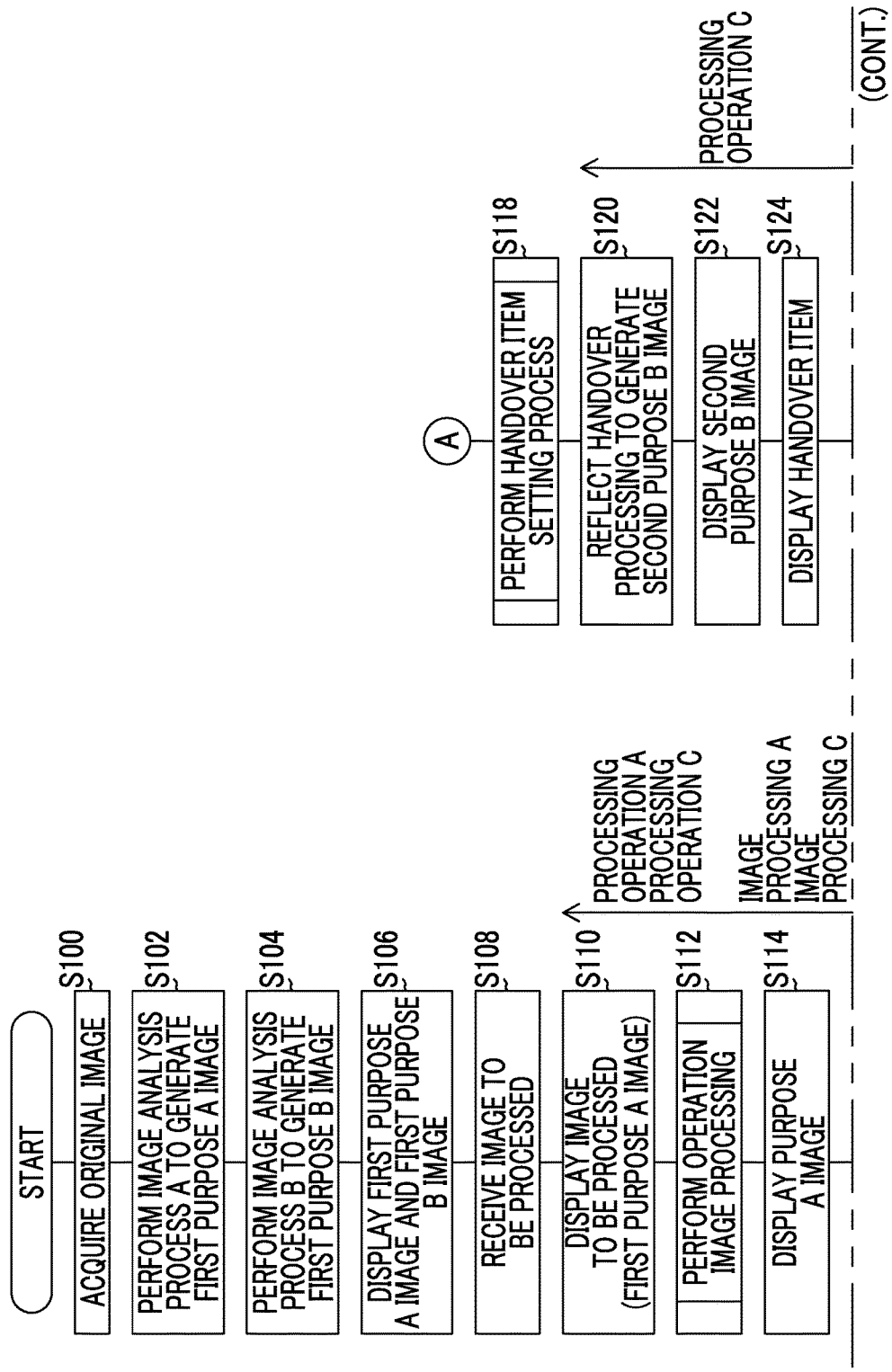
FIG. 7 is a flowchart of an example of image processing executed by a control unit of the console according to the application form of the first embodiment.

Next, image processing according to an application form of this embodiment will be described. FIG. 6 illustrates an example of a flow of image processing (processing operation) according to an application form in the console 20 of this embodiment. Further, FIG. 7 illustrates a flowchart of an example of image processing executed by the control unit 30 of the console 20 in this embodiment. In the console 20 of this embodiment, the control unit 30 executes the image processing program stored in the ROM to function as each unit of the present invention and execute the image processing illustrated in FIG. 7. Here, the "image analysis process" in this embodiment refers to image processing automatically performed by the console 20 (without an instruction from the user).

In step S100, the control unit 30 acquires an original image.

Then, in step S102, the control unit 30 performs image analysis process A to generate a first purpose A image. Then, in step S104, the control unit 30 performs image analysis process B to generate a first purpose B image. Image analysis process A and image analysis process B in this embodiment are predetermined image analysis processes in order to generate the purpose A image and the purpose B image from the original image. Image analysis process A and image analysis process B are not particularly limited except that image analysis process A and image analysis process B are determined depending on purposes. For example, image analysis process A and image analysis process B may be completely different type of image processing or may be the same type (for example, gradation process) of image processing with different parameters.

Then, in step S106, the control unit 30 displays the first purpose A image and the first purpose B image on the display 34. The console 20 performs display and causes the user to select an image on which the processing operation is performed.

Figure 8:
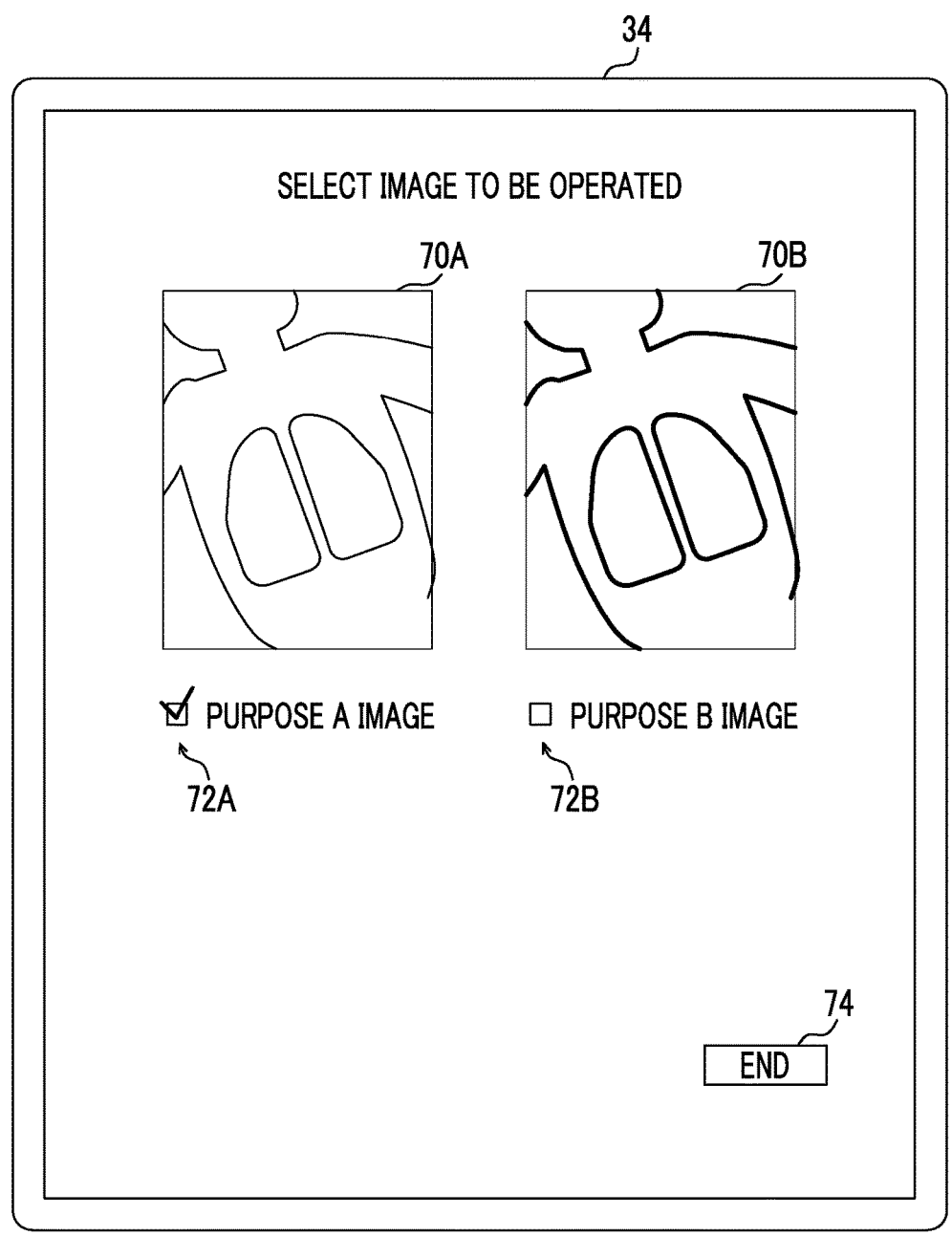
FIG. 8 is an illustrative diagram illustrating an example of a display of a first purpose A image and a first purpose B image according to the first embodiment.

FIG. 8 illustrates an example of a display of the first purpose A image and the first purpose B image. In the example illustrated in FIG. 8, the first purpose A image 70A, the first purpose B image 70B, a check box 72A for selecting the first purpose A image, a check box 72B for selecting the first purpose B image, and an end button 74 are displayed. The user checks any one of the check box 72A and the check box 72B to select an image on which a processing operation is to be performed. In FIG. 8, a state in which the check box 72A is checked and the first purpose A image is selected is illustrated. The selection by the user is completed in a case in which the end button 74 is button-down by the user.

While the first purpose A image 70A and the first purpose B image 70B are displayed in this embodiment, the check box 72A and the check box 72B may be displayed without displaying of the images.

In step S108, the control unit 30 receives the image to be processed (any one of the first purpose A image 70A and the first purpose B image 70B), which is selected by the user. In a case in which any one of the first purpose A image and the first purpose B image on which the user performs the processing operation is determined in advance, the processes of steps S106 and S108 may be omitted.

Then, in step S110, the control unit 30 displays the image to be processed on the display 34. In this embodiment, the control unit 30 performs various displays used for the user to perform a processing operation together with display of the image to be processed on the display 34. Hereinafter, a case in which the image to be processed is the first purpose A image 70A for convenience of description will be described.

Figure 10:
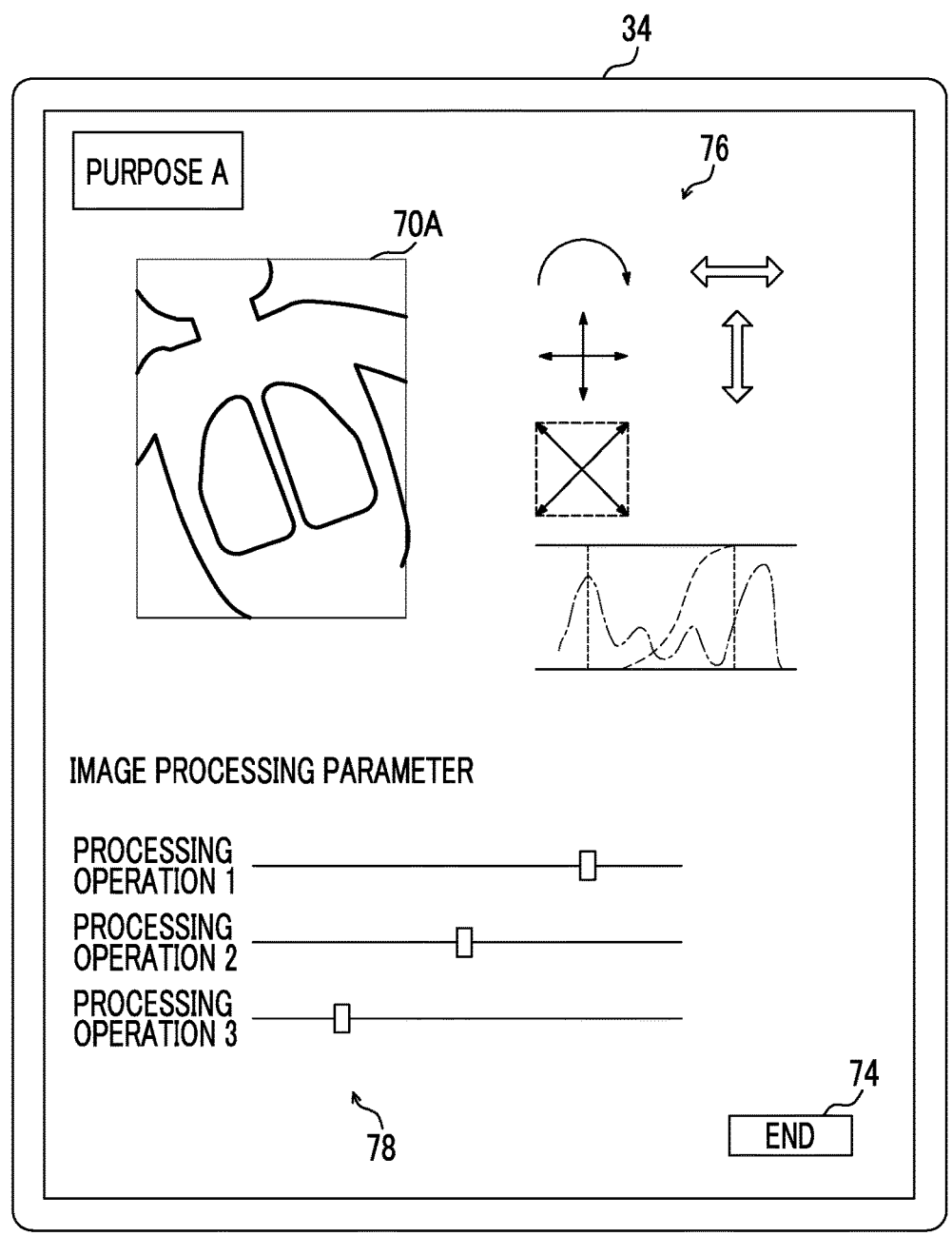
FIG. 10 is an illustrative diagram illustrating an example of an image to be processed and various displays enabling a user to perform a processing operation in the application form of the first embodiment.

FIG. 10 illustrates an example of the image to be processed and various displays used for the user to perform a processing operation in this embodiment. In the example illustrated in FIG. 10, the first purpose A image 70A, an end button 74, a processing operation selection portion 76, a parameter display portion 78 are displayed. Further, in the example illustrated in FIG. 10, icons corresponding to various processing operations used for the user to select a type of processing operation are displayed in the processing operation selection portion 76. Icons for selecting, for example, rotation, movement, enlargement, trimming, and a histogram representing concentration, luminance, or the like are displayed in the processing operation selection portion 76 in the example illustrated in FIG. 10. The user selects the processing operation from the processing operation selection portion 76 using the operation panel 38, and performs the processing operation on the first purpose A image 70A. A degree (parameter) of the processing operation performed by the user is displayed in the parameter display portion 78. The processing operation performed by the user is not limited to the example illustrated in FIG. 10.

The user performs, on the first purpose A image 70A, two types of image processing operations, including a processing operation for only purpose A, and a processing operation of taking over and reflecting processing in the purpose B image (first purpose B image 70B). In this embodiment, in order to distinguish the two types of processing operations from each other, the processing operation for only purpose A is referred to as "processing operation A", and image processing performed by the console 20 according to processing operation A is referred to as "image processing A". Further, the processing operation to hand over for the purpose B image is referred to as "processing operation C", and image processing performed by the console 20 according to processing operation C is referred to as "image processing C".

Figure 9:
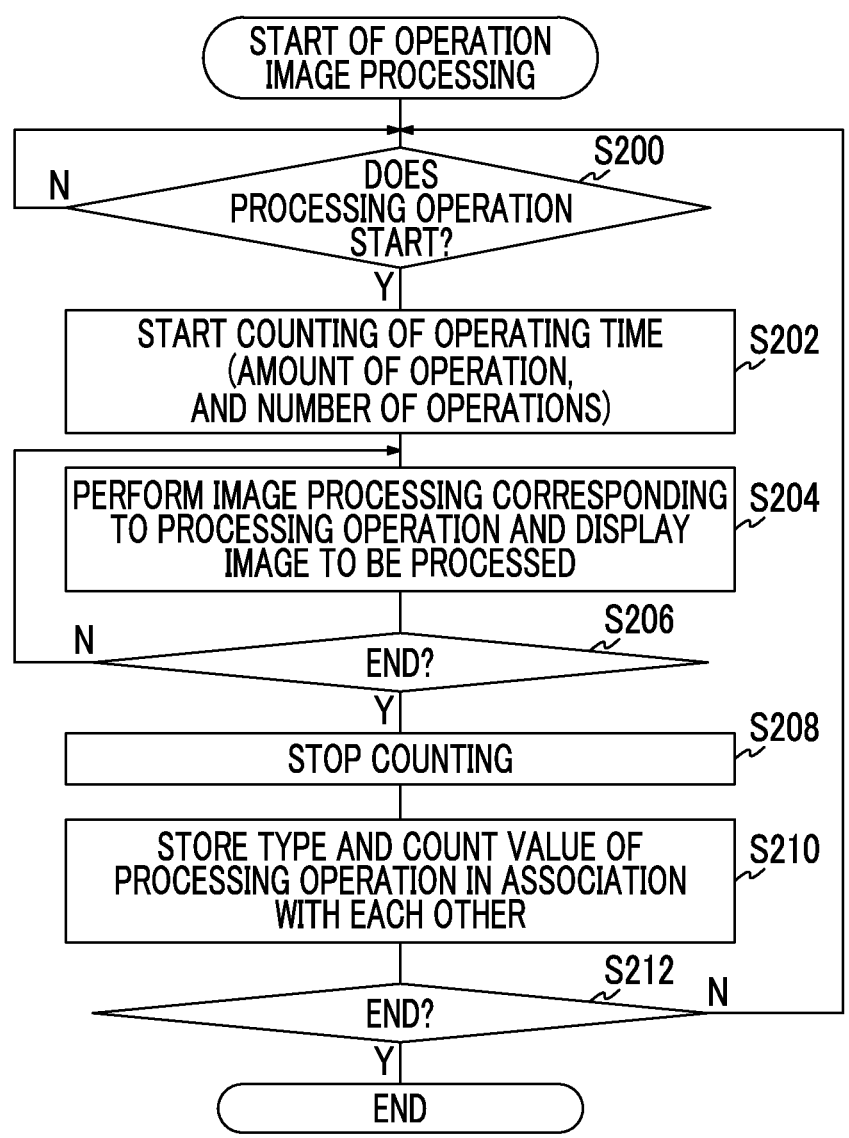
FIG. 9 is a flowchart of an example of operation image processing performed in image processing according to the application form of the first embodiment.

Then, in step S112, the control unit 30 performs operation image processing to perform image processing corresponding to the processing operation of the user. A flowchart of an example of the operation image processing performed in step S112 is illustrated in FIG. 9.

In step S200, the control unit 30 determines whether the processing operation starts. In this embodiment, for example, in a case in which the processing operation is selected in the processing operation selection portion 76 and any operation is performed on the first purpose A image 70A, it is determined that the processing operation has started. A specific example may include a case in which it is determined that the processing operation has started in a case in which button down for a mouse of the operation panel 38 is detected on the first purpose A image 70A. In a case in which the processing operation has not started, the control unit 30 becomes a standby state, and in a case in which the processing operation has started, the control unit 30 proceeds to step S202.

In step S202, the control unit 30 starts counting of at least one of operating time, an amount of operation, and the number of operations using a counter (not illustrated). A measurement rule that defines how to count one of operating time, an amount of operation, and the number of operations may be determined for each type of operation in advance. The measurement rule may set or selected by the user and is not particularly limited.

In step S204, the control unit 30 performs image processing corresponding to the processing operation on the first purpose A image 70A, and displays the first purpose A image 70A (image to be processed) subjected to the image processing on the display 34. That is, the images corresponding to the processing operations performed by the user are sequentially generated, and sequentially displayed in place of first purpose A image 70A of the display 34 illustrated in FIG. 10.

Then, in step S206, the control unit 30 determines whether the processing operation has ended. A specific example thereof may include a case in which, in a case in which the control unit 30 receives button-down of the mouse of the operation panel 38 performed by the user and detects start of the processing operation, a time point of button-up is determined to be the end of the processing operation. In a case in which the processing operation has not ended, the control unit 30 returns to step S204 and repeats the processing. On the other hand, in a case in which the processing operation has ended, the control unit 30 proceeds step S208 and stops counting in step S208.

Then, in step S210, the control unit 30 stores the type and the count value of the processing operation in the storage unit of the control unit 30 in association with each other. In this embodiment, a specific example may include a case in which the processing operation of rotating the image has been performed four times as 15° right rotation (1 second), 10° left rotation (10 seconds), 15° right rotation (5 seconds), and 30° right rotation (0.5 seconds). As processing content, four types including "15° right rotation for 1 second", "10° left rotation for 10 seconds", "15° right rotation for 5 seconds", and "30° right rotation for 0.5 seconds" are stored. Further, a specific example may include a case in which the user performs, as the processing operation, mark addition for 20 seconds, comment addition for 10 seconds, and concentration correction for one hour. As processing content, three types including "mark addition for 20 seconds", "comment addition for 10 seconds", and "concentration correction for 1 hour" are stored.

Then, in step S212, the control unit 30 determines whether the processing operation by the user has ended. In this embodiment, it is determined that the processing operation has ended in a case in which the control unit 30 has detected that the end button 74 displayed on the display 34 illustrated in FIG. 10 has been instructed by the user. In a case in which the processing operation does not end, the control unit 30 returns to step S200 and repeats the process of steps S200 to S210 for a new processing operation. On the other hand, in a case in which the control unit 30 has detected that the end button 74 has been instructed by the user, the control unit 30 ends this operation image processing, and proceeds to step S114 for image processing (see FIG. 7).

Figure 11:
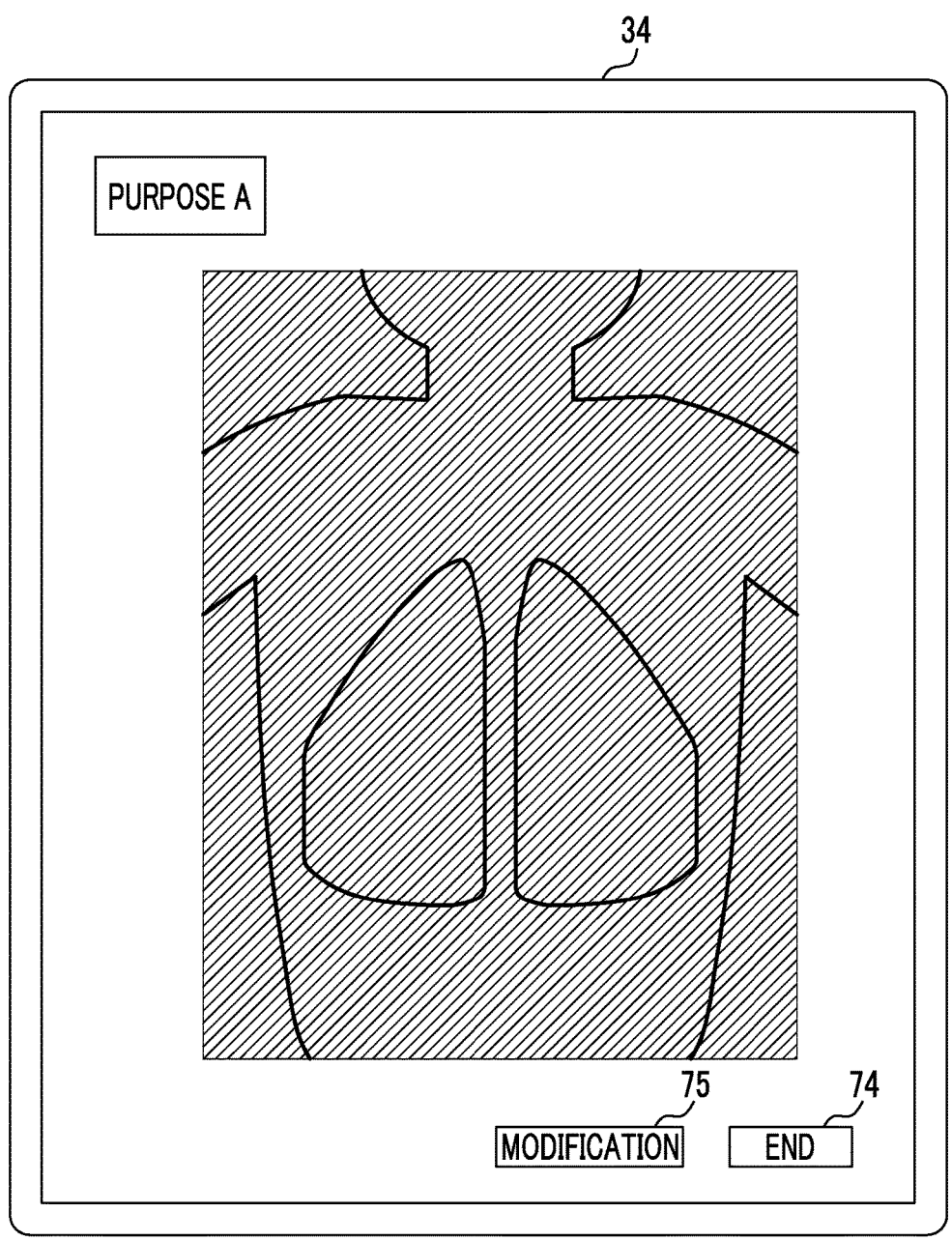
FIG. 11 is an illustrative diagram illustrating an example of a display of a purpose A image for confirmation in the application form of the first embodiment.

In this embodiment, in a case in which the operation image processing ends, the generation of the purpose A image ends. Accordingly, in step S114, the control unit 30 displays the purpose A image on the display 34, and causes the user to confirm the purpose A image. FIG. 11 illustrates an example of a display of the purpose A image for confirmation in this embodiment. In the example illustrated in FIG. 11, the purpose A image, an end button 74, and a modification button 75 are displayed. The control unit 30 of this embodiment detects that the end button 74 is buttoned down to complete generation of the purpose A image. Further, although not illustrated in FIG. 7, in a case in which the control unit 30 detects that the modification button 75 is buttoned down, the console 20 in this embodiment performs the process of step S112 again and performs correction of the purpose A image.

In a case in which the control unit 30 detects that the end button 74 is buttoned down, the control unit 30 proceeds to step S116. In step S116, the control unit 30 stores image information of the purpose A image and content of the image processing (including the image analysis process) performed for generation of the purpose A image in the storage unit of the control unit 30 in association with each other.

Figure 12:
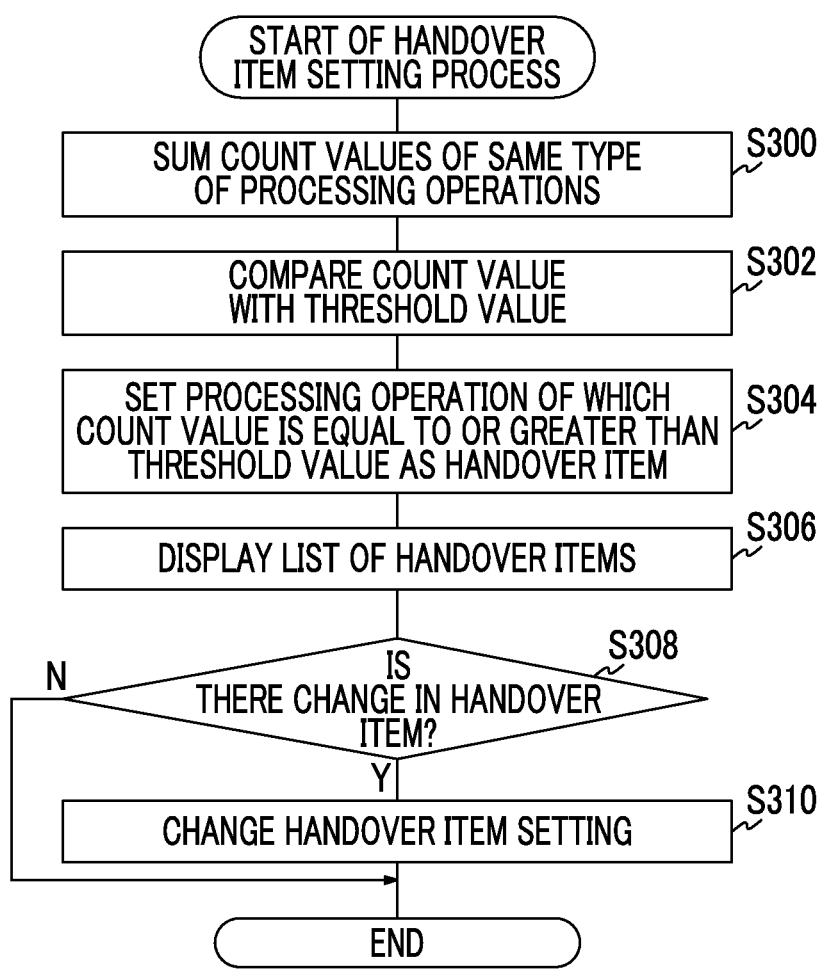
FIG. 12 is a flowchart of an example of a handover item setting process according to the application form of the first embodiment.

Then, in step S118, the control unit 30 performs a handover item setting process of setting a handover processing operation for the first purpose B image 70B among the processing operations performed on the first purpose A image 70A. FIG. 12 illustrates a flowchart of an example of a handover item setting process of this embodiment.

In step S300, the control unit 30 sums count values of the same type of processing operations performed on the first purpose A image 70A. In this embodiment, the control unit 30 sums the count values of the same type of processing operations from among the processing content stored through the process of step S116.

The type of processing operation is determined in advance, and a definition of the type of processing operation is stored in the storage unit 64 in advance. The definition of the type of processing operation may be set or selected by the user. In the specific example in which "rotation" is defined as the type of processing operation, four processing operations of which the type is "rotation" are stored, and accordingly, count values (here, frequency) are summed, and 50° right rotation is for 16.5 seconds.

Then, in step S302, the control unit 30 compares the count value with a threshold value. The control unit 30 of this embodiment determines that a processing operation satisfying handover conditions of any one of a processing operation requiring time, a processing operation of which the amount of operation is large, and a processing operation of which the number of operations is large is a processing operation requiring time and effort, for each type of processing operations, and hands over the processing operation as a processing operation for the first purpose B image 70B.

In this embodiment, in a specific example, rotation of 10 seconds or more, mark addition of 30 seconds or more, comment addition of 1 minute or more, and non-handover of concentration correction are defined as handover conditions (threshold values) in advance and stored in the storage unit of the control unit 30. The definition of the handover conditions may be set or selected by the user.

In step S302, the control unit 30 compares a threshold value which is a handover condition with the count value. Then, in step S304, the control unit 30 sets the processing operation (for each type) of which the count value is equal to or greater than the threshold value as a handover item. In the console 20 of this embodiment, a setting storage unit that stores settings is provided in the control unit 30 (not illustrated). By storing the settings in the setting storage unit, setting of the handover item is performed. In this embodiment, since the count value of the rotation is equal to or greater than the threshold value, and the count values of the other processing operations (mark addition, comment addition, and concentration correction) are smaller than the threshold values, or there is no handover, only the rotation is set as a handover item. In the flow of the image processing illustrated in FIG. 7, the mark addition, the comment addition, and the concentration correction correspond to processing operation A, and the rotation corresponds to processing operation C.

Then, in step S306, the control unit 30 creates a list of the handover items and displays the list on the display 34. FIGS. 13A to 13D illustrate an example of a display of the list of the handover items in this embodiment. Display of the list of the handover items may be performed so that the user confirms the handover items and the user performs the setting of the handover items, and is not particularly limited.

Figure 13A:
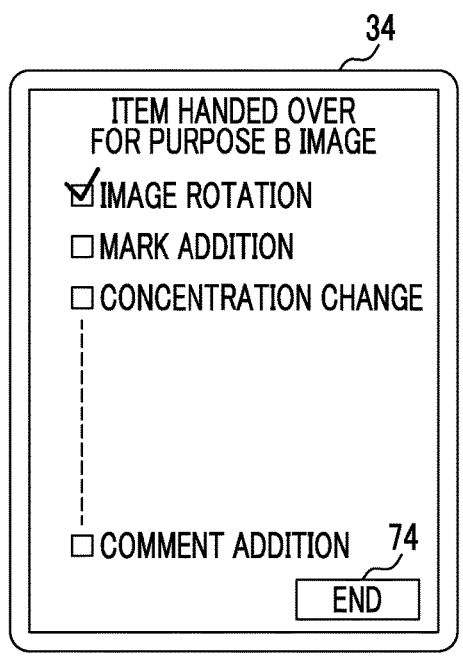
FIGS. 13A to 13D are illustrative diagrams illustrating an example of a display of a list of handover items in the application form of the first embodiment.

In the handover item list illustrated in FIG. 13A, a list of types of processing operations performed by the user is displayed, and the handover item set in step S304 is shown through checking of a check box. The user performs setting of the handover items by unchecking the checkbox for a processing operation of which the handover is not required among the checked handover items, and checking the check box for the processing operation of which handover is required among the handover items that have not been checked.

Figure 13B:
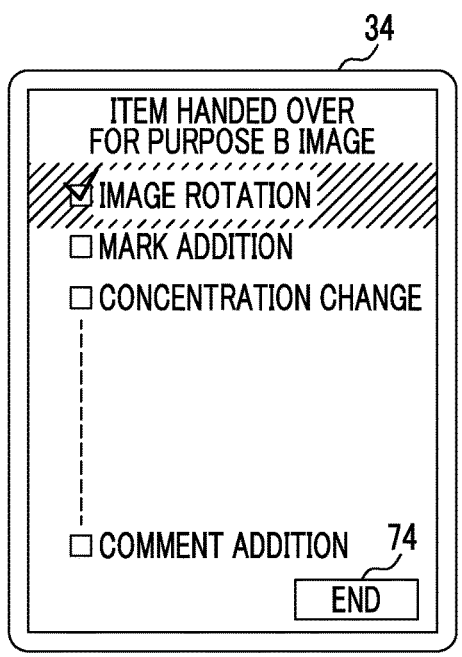

In the handover item list illustrated in FIG. 13B, a list of types of processing operations performed by the user is displayed, and the handover item set in step S304 is shown through checking of a check box. Further, in the case illustrated in FIG. 13B, a previously set (checked) handover item cannot be changed by the user. The user performs setting of the handover item by checking the check box for the processing operation of which the handover is required among the handover items that have not been checked.

Figure 13C:
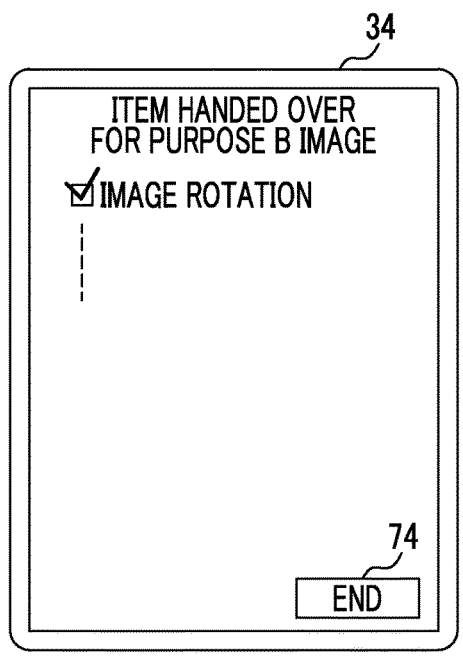

Further, in the handover item list illustrated in FIG. 13C, only the handover item set in step S304 is displayed. The user performs setting of the handover item by unchecking the check box for the processing operation of which the handover is not required among the checked handover items.

Figure 13D:
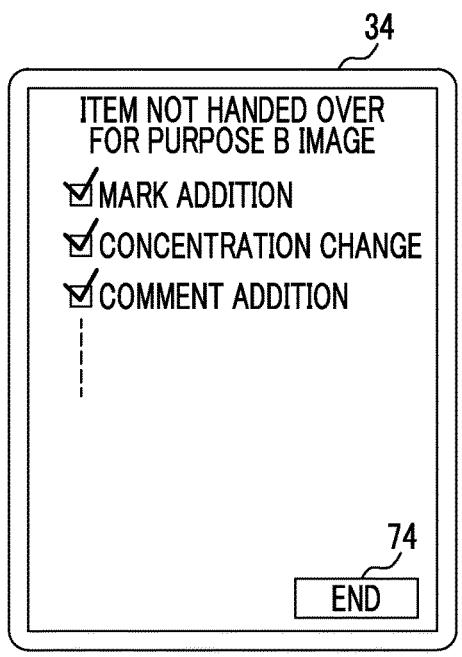

Further, in the handover item list illustrated in FIG. 13D, only processing operations which are not the handover item set in step S304, that is, items of processing operations that are not handed over are displayed. The user can set the processing operation that is not handed over in the handover item by checking the check box.

Then, in step S308, the control unit 30 determines whether or not there is a change in the handover item performed by the user. In this embodiment, since any one of the displays of the lists of the handover items illustrated in FIGS. 13A to 13D is performed, in a case in which an instruction to the check box is detected, the control unit 30 determines that the handover item has changed. In a case in which the handover item has not been changed, the control unit 30 ends the handover item setting process, and proceeds to step S120 of image processing (see FIG. 7). On the other hand, in a case in which the handover item has been changed, the control unit 30 proceeds to step S310.

In step S310, the control unit 30 changes the setting stored in the setting storage unit of the control unit 30 according to the change detected in step S308, ends this handover item setting process, and proceeds to step S120 of image processing (see FIG. 7).

In step S120, the control unit 30 of the console 20 reflects the processing operation (handover process) set in the handover item in the first purpose B image 70B to generate a second purpose B image. In this embodiment, since the rotation has been handed over, the control unit 30 rotates the first purpose B image 70B (right 50°) to generate the second purpose B image.

Figure 14:
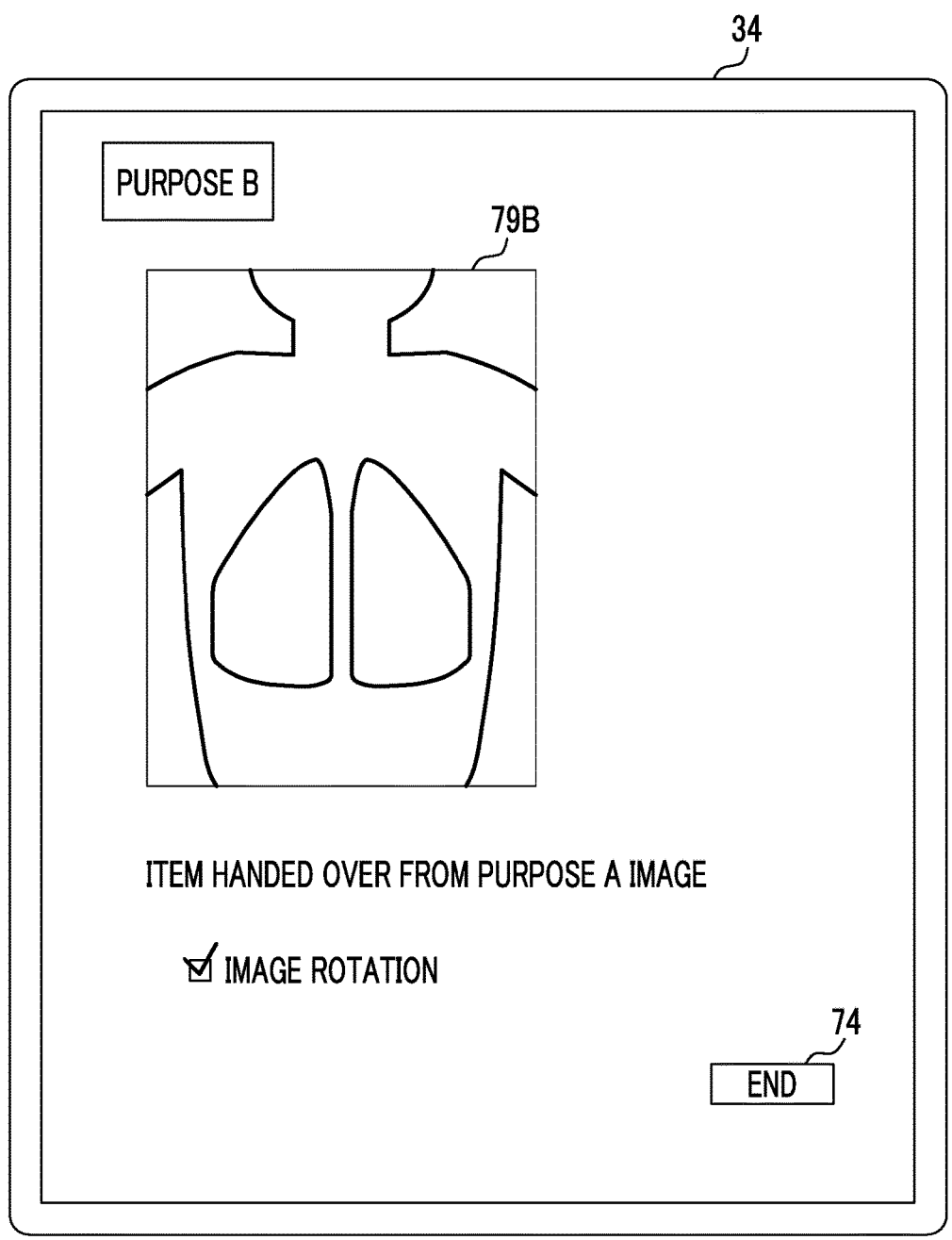
FIG. 14 is an illustrative diagram illustrating an example of a display of a second purpose B image and handover items in the application form of the first embodiment.

Then, in step S122, the control unit 30 displays the second purpose B image on the display 34. Then, in step S124, the control unit 30 displays the handover item on the display 34. FIG. 14 illustrates an example of a display of the second purpose B image and the handover item.

Then, in step S126, the control unit 30 determines whether there is a change in the handover item. In this embodiment, the handover item can be changed. For example, in the display illustrated in FIG. 14, in a case in which there is a processing operation for which no handover is determined to be good, the user unchecks the check box of the handover item to change the handover item. The item of another processing operation (processing operation A) performed on the first purpose A image 70A may be displayed and changed so that the processing operation not set in the handover item is handed over.

In a case in which there is no change in the handover item and button-down of the end button 74 is detected, the control unit 30 proceeds to step S130. On the other hand, in a case in which there is a change in the handover item, the control unit 30 proceeds to step S128. In step S128, the control unit 30 generates an image according to the change.

Then, in step S130, the control unit 30 displays the image to be processed on the display 34. In this step, the control unit 30 performs various displays used for the user to perform the processing operation together with the display of the image to be processed on the display 34, as in step S110. In a specific example of this embodiment, in the display illustrated in FIG. 10, a purpose name is changed to purpose B, and display of the image to be processed as the second image 79B for purpose B (or the image generated in step S128) is performed.

The user performs a processing operation for the purpose B image according to the display, similar to the processing operation in the first purpose A image 70A described above. Then, in step S132, the control unit 30 determines whether there is a processing operation. In a case in which there is no processing operation, the control unit 30 becomes a standby state. On the other hand, in a case in which there is a processing operation, the control unit 30 proceeds to step S134 and performs image processing corresponding to the processing operation. In this step, images according to the processing operations performed by the user are sequentially generated, and sequentially displayed on the display 34, as in step S204 of the operation image processing.

Then, in step S136, the control unit 30 determines whether the processing operation ends. In this embodiment, in a case in which button-down of the end button 74 is detected, the control unit 30 determines that the processing operation ends. In a case in which the processing operation does not end, the control unit 30 returns to step S132, and repeats the processing operation. On the other hand, in a case in which the processing operation ends, the control unit 30 proceeds to step S138.

Figure 15:
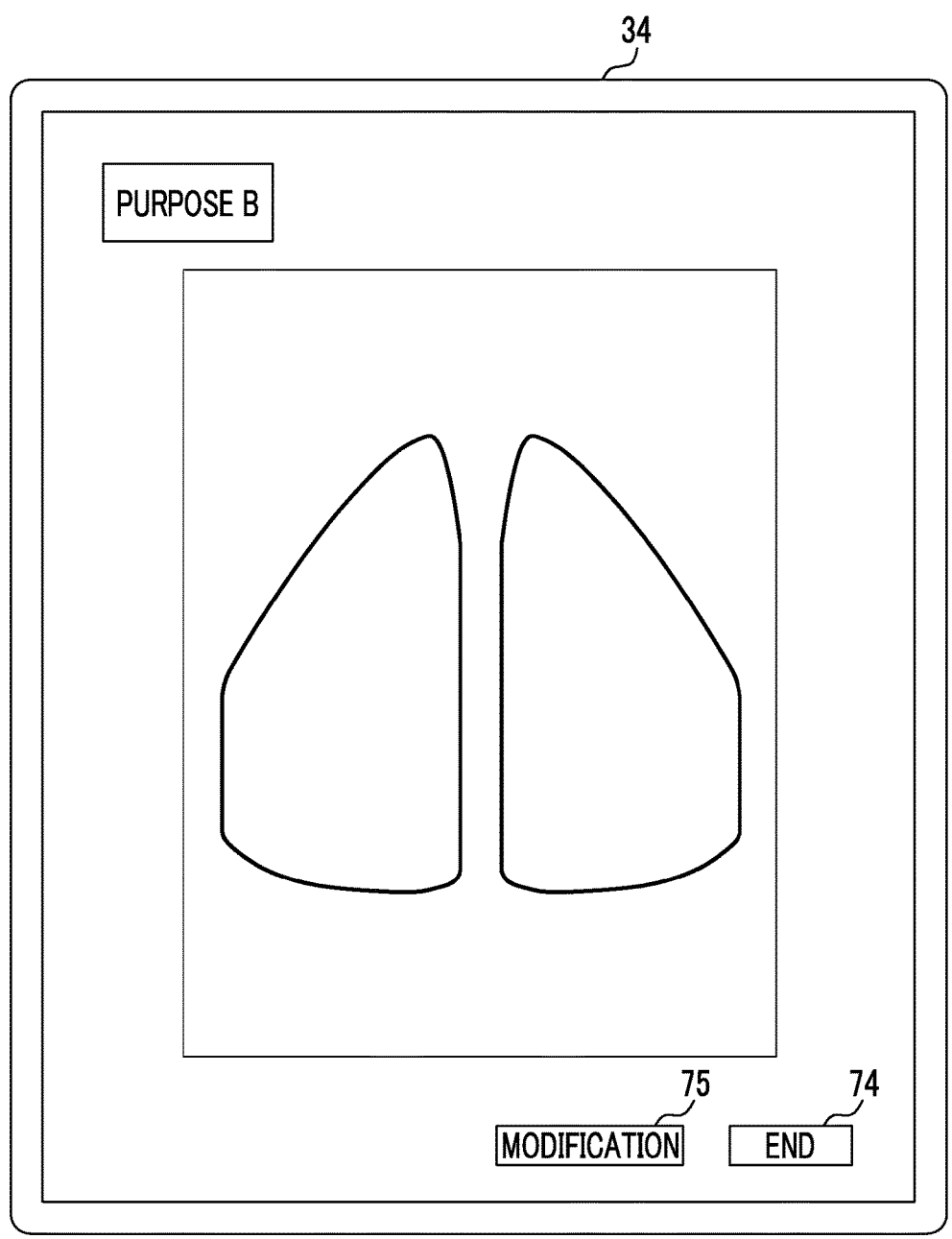
FIG. 15 is an illustrative diagram illustrating an example of a display of a purpose B image for confirmation in the application form of the first embodiment.

In step S138, the control unit 30 displays the purpose B image on the display 34 and causes the user to confirm the purpose B image, similar to step S114. FIG. 15 illustrates an example of a display of the purpose B image for confirmation in this embodiment. In the example illustrated in FIG. 15, the purpose B image, an end button 74, and a modification button 75 are displayed. The control unit 30 of this embodiment detects that the end button 74 is buttoned down to complete generation of the purpose B image. Further, although not illustrated in FIG. 7, in a case in which the control unit 30 of this embodiment has detected that the modification button 75 is buttoned down, the control unit 30 performs the process of steps S132 to S136 again and performs correction of the purpose B image.

Then, in step S140, the control unit 30 stores image information of the purpose B image and content of the image processing (including the image analysis process) performed for generation of the purpose B image in the storage unit of the control unit 30 in association with each other, and then, ends the image processing. In a case in which respective output destinations of the purpose A image and the purpose B image generated through the image processing are determined in advance or designated by the user, the purpose A image and the purpose B image may be output to the respective destinations (for example, the radiographic image processing device 50 or the radiographic image interpretation device 52 of the PACS 22).

Second Embodiment

Since a radiographic image capturing system 10, a console 20, and a PACS 22 in this embodiment have substantially the same configuration and operation as the radiographic image capturing system 10, the console 20, and the PACS 22 of the first embodiment, detailed description of the same units is omitted.

Since the configurations of the radiographic image capturing system 10, the console 20, and the PACS 22 are the same as those in the first embodiment, description thereof is omitted in this embodiment.

In the console 20 of this embodiment, a timing at which the processing operation set as the handover item is reflected in another image (an image on which the user has not performed a processing operation) is different from that in the application form of the first embodiment.

Figure 16:
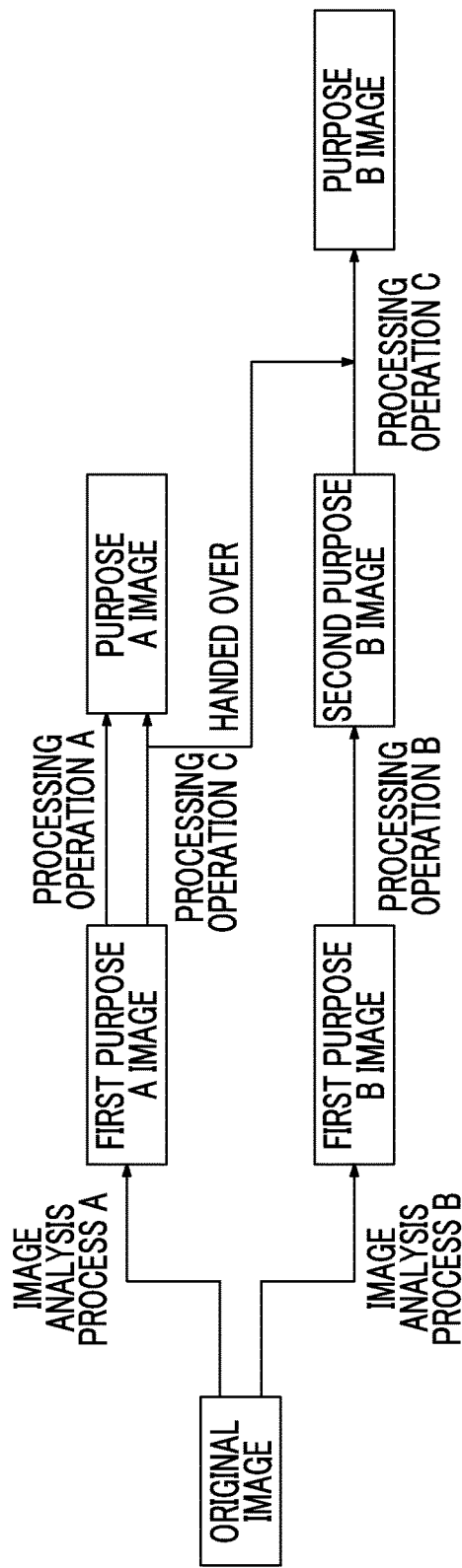
FIG. 16 is an illustrative diagram illustrating an example of a flow of image processing (processing operation) in a console according to a second embodiment.

FIG. 16 illustrates an example of a flow of image processing (processing operation) in the control unit 30 of the console 20 in this embodiment. A case in which the processing operation performed on the purpose A image (first purpose A image) by the user is handed over for the purpose B image for convenience of description in this embodiment will be described.

In this embodiment, as illustrated in FIG. 16, the image processing (processing operation) for generating the purpose A image is the same as that in the application form of the first embodiment (see FIG. 6). Meanwhile, in the image processing (processing operation) for generating the purpose B image, the console 20 performs image analysis process B on the original image to generate the first purpose B image, and then, processing operation B (processing operation performed for generation of the purpose B image and not performed for generation of the purpose A image) is performed by the user and the second purpose B image is generated. The console 20 reflects processing operation C which is a processing operation which has been handed over in the second purpose B image to generate the purpose B image.

FIG. 17 illustrates a flowchart of an example of image processing executed by the control unit 30 of the console 20 in this embodiment. In the image processing of this embodiment, since timings of processing operation B and processing operation C are interchanged with those in the application form of the first embodiment, a process corresponding to steps S120 to S128 of image processing (see FIG. 7) according to the application form of the first embodiment is performed between step S136 and step S138, as illustrated in FIG. 17.

The control unit 30 of this embodiment completes the generation of the purpose A image and sets the handover item in the same manner as the application form of the first embodiment from steps S100 to step S118.

The control unit 30 of this embodiment proceeds to step S130 subsequent to step S118. The control unit 30 of this embodiment performs image processing B corresponding to processing operation B of the user to generate the second purpose B image in the same manner as the application form of the first embodiment from step S130 to step S136.

A process of each of subsequent steps S137-1 to S137-5 corresponds to each of steps S120 to S128 of image processing according to the application form of the first embodiment. That is, through each of processes of steps S137-1 to S137-3, the control unit 30 of this embodiment reflects processing operation C which is handover processing in the image subjected to image processing B corresponding to processing operation B to generate the purpose B image, and displays the handover item on the display 34 together with the purpose B image.

Further, in steps S137-4 and S137-5, the control unit 30 determines whether there is a change in the handover item. In a case in which there is no change in the handover item, the control unit 30 proceeds to step S138 since the generation of the purpose B image is completed. On the other hand, in a case in which there is a change in the handover item, the control unit 30 proceeds to step S138 since the generation of the purpose B image is completed by generating an image according to the change.

Next steps S138 and S140 are the same as those in the application form of the first embodiment. In step S138, the control unit 30 displays the purpose B image on the display 34 and causes the user to confirm the purpose B image. In step S140, the control unit 30 stores image information of the purpose B image and content of the image processing (including the image analysis process) performed for generation of the purpose B image in the storage unit of the control unit 30 in association with each other, and then, ends the image processing.

Third Embodiment

Since a radiographic image capturing system 10, a console 20, and a PACS 22 in this embodiment have substantially the same configuration and operation as the radiographic image capturing system 10, the console 20, and the PACS 22 of each embodiment, detailed description of the same units is omitted.

Since the configurations of the radiographic image capturing system 10, the console 20, and the PACS 22 are the same as those in the first embodiment, description thereof is omitted in this embodiment.

In the console 20 of this embodiment, an image on which the user performs a processing operation including the processing operation which is the handover processing is determined in advance, and a timing at which an image analysis process is performed on the image on which the user has not performed the processing operation differs from that in an application form of the first embodiment of the present invention.

Figure 18:
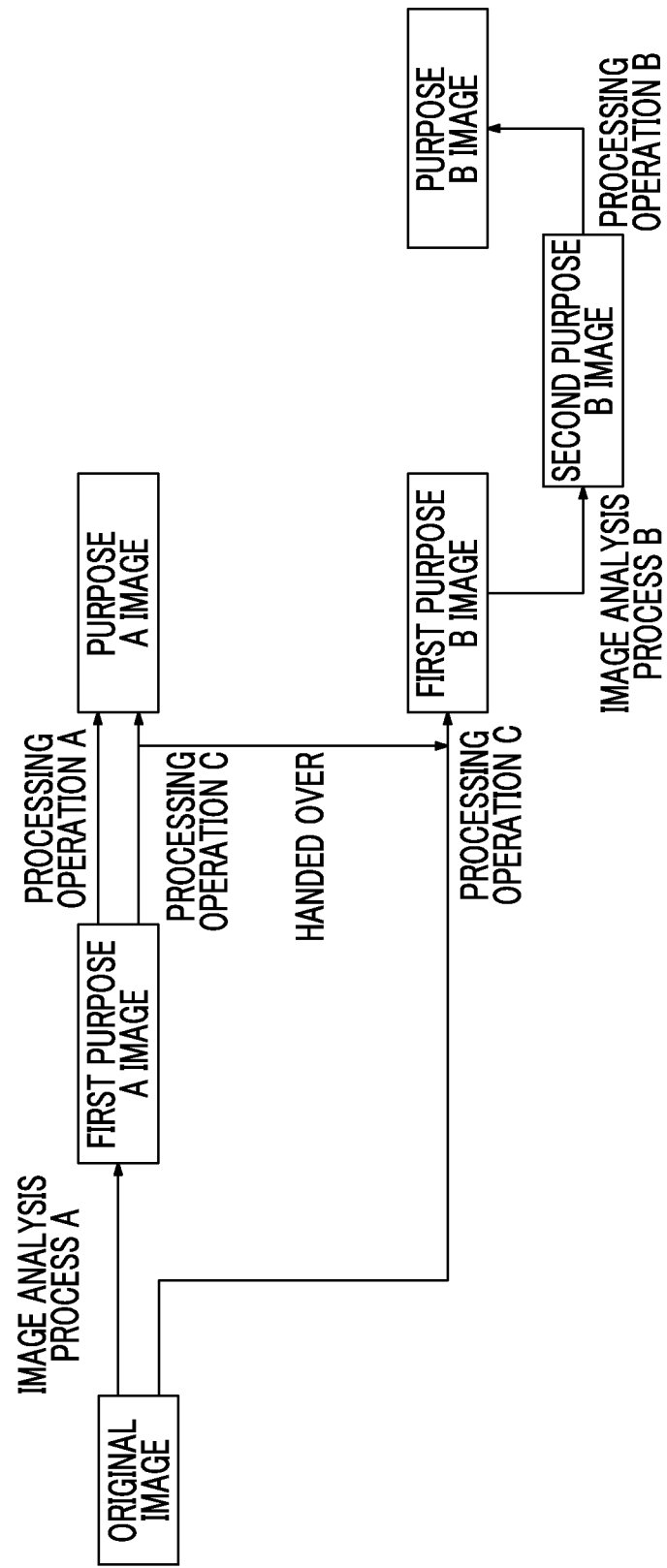
FIG. 18 is an illustrative diagram illustrating an example of a flow of image processing (processing operation) in a console according to a third embodiment.

FIG. 18 illustrates an example of a flow of image processing (processing operation) in the control unit 30 of the console 20 in this embodiment. A case in which the processing operation performed on the purpose A image (first purpose A image) by the user is handed over for the purpose B image for convenience of description in this embodiment will be described.

In this embodiment, as illustrated in FIG. 18, the image processing (processing operation) for generating the purpose A image is the same as in the application form of the first embodiment (see FIG. 7). Meanwhile, in the image processing (processing operation) for generating the purpose B image, the control unit 30 of the console 20 reflects processing operation C which is a processing operation handed over for the original image to generate the first purpose B image. Image analysis process B is performed on the first purpose B image such that the second purpose B image is generated, and then, processing operation B is performed by the user such that the purpose B image is generated.

Figure 19:
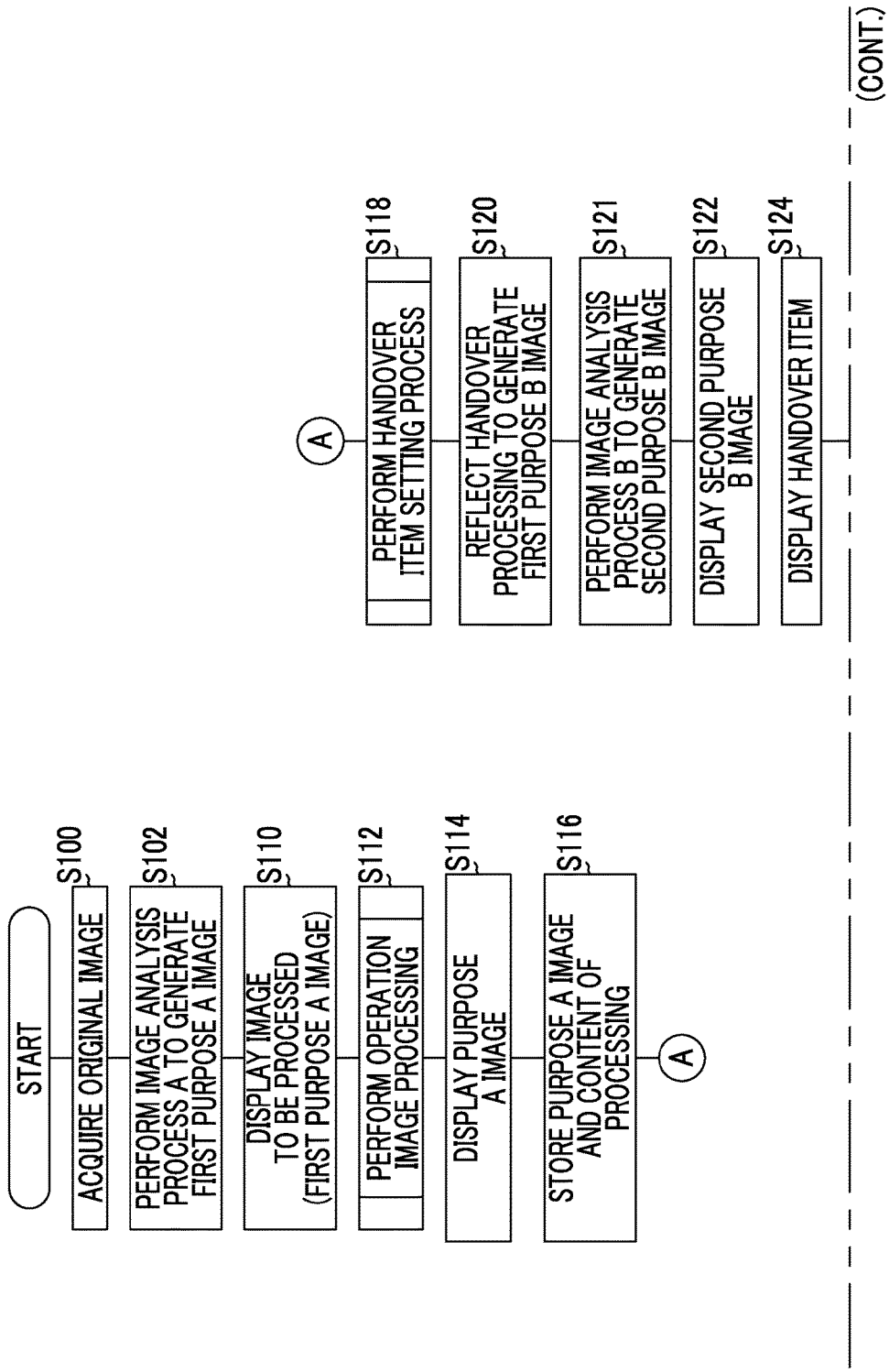
FIG. 19 is a flowchart of an example of image processing executed by a control unit of the console in the third embodiment.

FIG. 19 illustrates a flowchart of an example of image processing executed by the control unit 30 of the console 20 in this embodiment. Since the image processing of this embodiment is determined to perform processing operations including a processing operation that is handover processing on the purpose A image (first purpose A image) in advance, the processes of steps S106 and S108 in the image processing (see FIG. 7) according to the application form of the first embodiment are not provided as illustrated in FIG. 19. Further, since the image processing of this embodiment is different from that in the application form of the first embodiment in the timing of image analysis process B, processing corresponding to step S104 of image processing (see FIG. 7) of the first embodiment is performed between step S120 and step S122, as illustrated in FIG. 19.

The control unit 30 of this embodiment completes the generation of the purpose A image in the same manner as the application form of the first embodiment from step S100 to step S118 except that the control unit 30 proceeds to step S110 after step S102, and performs setting of the handover item.

The control unit 30 of this embodiment reflects processing operation C which is handover processing in the original image to generate a first purpose B image in step S120 subsequent to step S118.

Next step S121 corresponds to step S104 of the application form of the first embodiment. In step S121, the control unit 30 performs image analysis process B on the first purpose B image to generate a second purpose B image.

A process of each of next steps S122 to S140 is the same as that in the application form of the first embodiment. The control unit 30 confirms the handover item, performs image processing corresponding to processing operation B of the user to generate a purpose B image, and then, ends the image processing.

The timing of performing image analysis process B (step S121) is not limited to this embodiment and may be performed before step S130. While image analysis process B is performed, and then, the image processing corresponding to processing operation B is performed in the image processing of this embodiment, the order may be reversed such that the image processing corresponding to processing operation B is performed, and then, image analysis process B is performed.

Fourth Embodiment

Since a radiographic image capturing system 10, a console 20, and a PACS 22 in this embodiment have substantially the same configuration and operation as the radiographic image capturing system 10, the console 20, and the PACS 22 of each embodiment, detailed description of the same units is omitted.

Since the configurations of the radiographic image capturing system 10, the console 20, and the PACS 22 are the same as those in the first embodiment, description thereof is omitted in this embodiment.

In the console 20 of this embodiment, the timings of processing operation B (image processing B) and image analysis process B is interchanged with those in the application form of the first embodiment.

Figure 20:
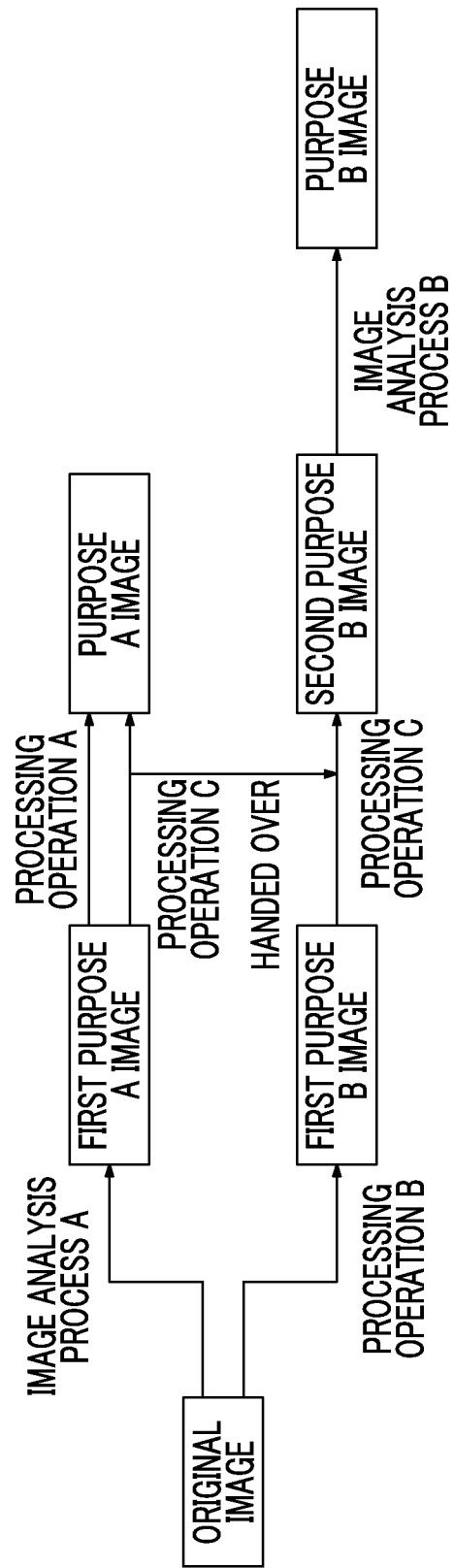
FIG. 20 is an illustrative diagram illustrating an example of a flow of image processing (processing operation) in a console according to a fourth embodiment.

FIG. 20 illustrates an example of a flow of image processing (processing operation) in the control unit 30 of the console 20 in this embodiment. A case in which the processing operation performed on the purpose A image (first purpose A image) by the user is handed over for the purpose B image for convenience of description in this embodiment will be described.

In this embodiment, as illustrated in FIG. 20, the image processing (processing operation) for generating the purpose A image is the same as in the application form of the first embodiment (see FIG. 7). Meanwhile, in the image processing (processing operation) for generating the purpose B image, processing operation B is performed on the original image by the user and the first purpose B image is generated. The control unit 30 reflects processing operation C which is a handover processing operation in the first purpose B image to generate the second purpose B image. Further, the control unit 30 performs image analysis process B on the second purpose B image to generate the purpose B image.

Figure 21:
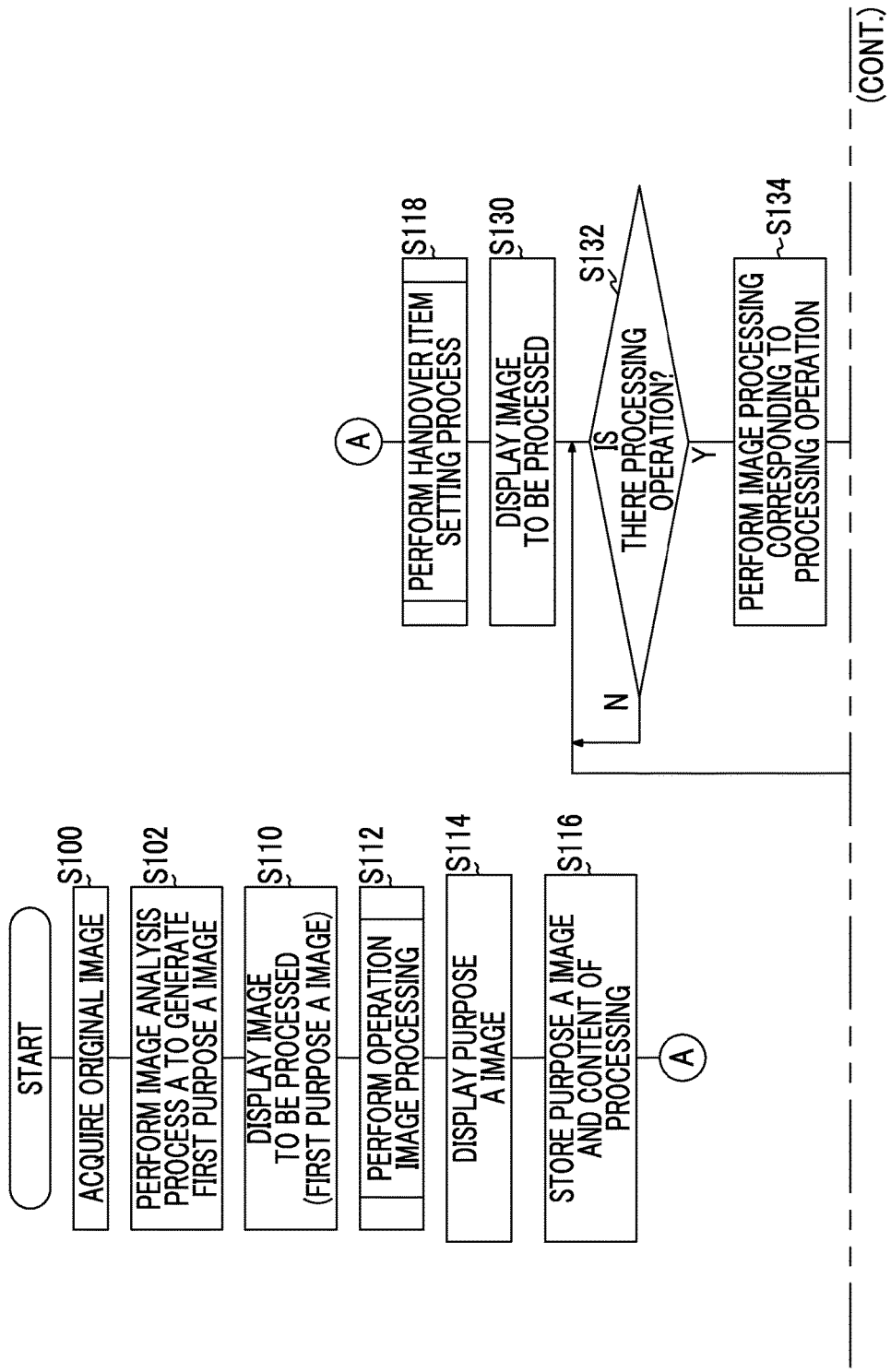
FIG. 21 is a flowchart of an example of image processing executed by a control unit of the console in the fourth embodiment.

FIG. 21 illustrates a flowchart of an example of image processing executed by the control unit 30 of the console 20 in this embodiment. In the image processing of this embodiment, since the timings of image analysis process B and processing operation B are interchanged with those in the application form of the first embodiment, a process corresponding to steps S120 to S128 of image processing (see FIG. 7) according to the application form of the first embodiment is performed between step S136 and step S138, as illustrated in FIG. 21. Further, the process corresponding to step S104 is executed before step S138.

Further, the image processing of this embodiment is determined to perform processing operations including a processing operation which is the handover processing on the purpose A image (first purpose A image) in advance, similar to the third embodiment. Therefore, as illustrated in FIG. 20, the processes of steps S106 and S108 of the image processing (see FIG. 7) according to the application form of the first embodiment are not provided.

The control unit 30 of this embodiment completes the generation of the purpose A image in the same manner as the application form of the first embodiment from step S100 to step S118 except that the control unit 30 proceeds to step S110 after step S102, and performs setting of the handover item.

The control unit 30 of this embodiment proceeds to step S130 subsequent to step S118. The control unit 30 of this embodiment performs image processing B corresponding to processing operation B of the user to generate the second purpose B image in the same manner as the application form of the first embodiment from step S130 to step S136.

A process of each of subsequent steps S137-1 to S137-5 is the same as the process of each of steps S137-1 to S137-5 of the image processing in the second embodiment.

The control unit 30 reflects processing operation C which is handover processing in the image on which image processing B corresponding to processing operation B has been performed, to generate a second purpose B image, and displays the handover item on the display 34 together with the second purpose B image. Further, the control unit 30 determines whether there is a change in the handover item, proceeds to step S137-6 in a case in which there is no change in the handover item, and generates an image according to the change and proceeds to step S137-6 in a case in which there is a change in the handover item.

Step S137-6 corresponds to step S104 of the application form of the first embodiment. In step S137-6, the control unit 30 performs image analysis process B on the second purpose B image to generate a purpose B image.

Next steps S138 and S140 are the same as those in the application form of the first embodiment. In step S138, the control unit 30 displays the purpose B image on the display 34 and causes the user to confirm the purpose B image. In step S140, the control unit 30 stores image information of the purpose B image and content of the image processing (including the image analysis process) performed for generation of the purpose B image in the storage unit of the control unit 30 in association with each other, and then, ends the image processing.

Fifth Embodiment

Since a radiographic image capturing system 10, a console 20, and a PACS 22 in this embodiment have substantially the same configuration and operation as the radiographic image capturing system 10, the console 20, and the PACS 22 of each embodiment, detailed description of the same units is omitted.

Since the configurations of the radiographic image capturing system 10, the console 20, and the PACS 22 are the same as those in the first embodiment, description thereof is omitted in this embodiment.

In the control unit 30 of the console 20 in this embodiment, timings of image analysis process B and processing operation B (image processing B) are interchanged with those in the fourth embodiment.

Figure 22:
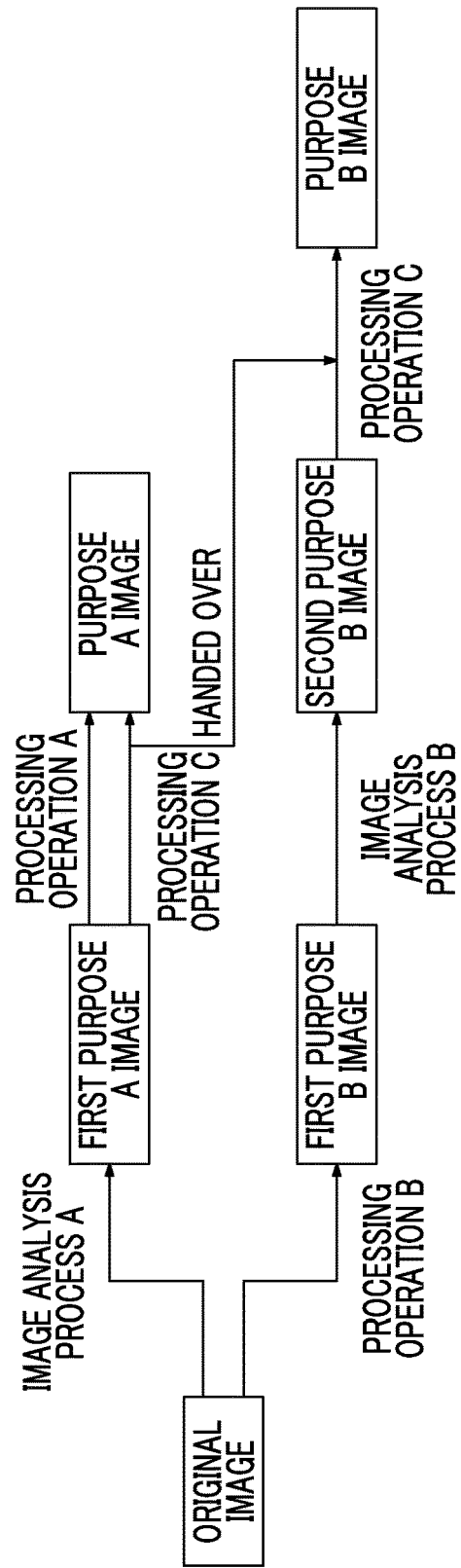
FIG. 22 is an illustrative diagram illustrating an example of a flow of image processing (processing operation) in a console according to a fifth embodiment.

FIG. 22 illustrates an example of a flow of image processing (processing operation) in the control unit 30 of the console 20 in this embodiment. A case in which the processing operation performed on the purpose A image (first purpose A image) by the user is handed over for the purpose B image for convenience of description will be described in this embodiment.

In this embodiment, as illustrated in FIG. 22, the image processing (processing operation) for generating the purpose A image is the same as that in the fourth embodiment (see FIG. 20). Meanwhile, in the image processing (processing operation) for generating the purpose B image, processing operation B is performed on the original image by the user, and the first purpose B image is generated. Then, the control unit 30 performs image analysis process B on the first purpose B image to generate a second purpose B image. Further, the control unit 30 reflects processing operation C which is the handover processing operation in the second purpose B image to generate the purpose B image.

Figure 23:
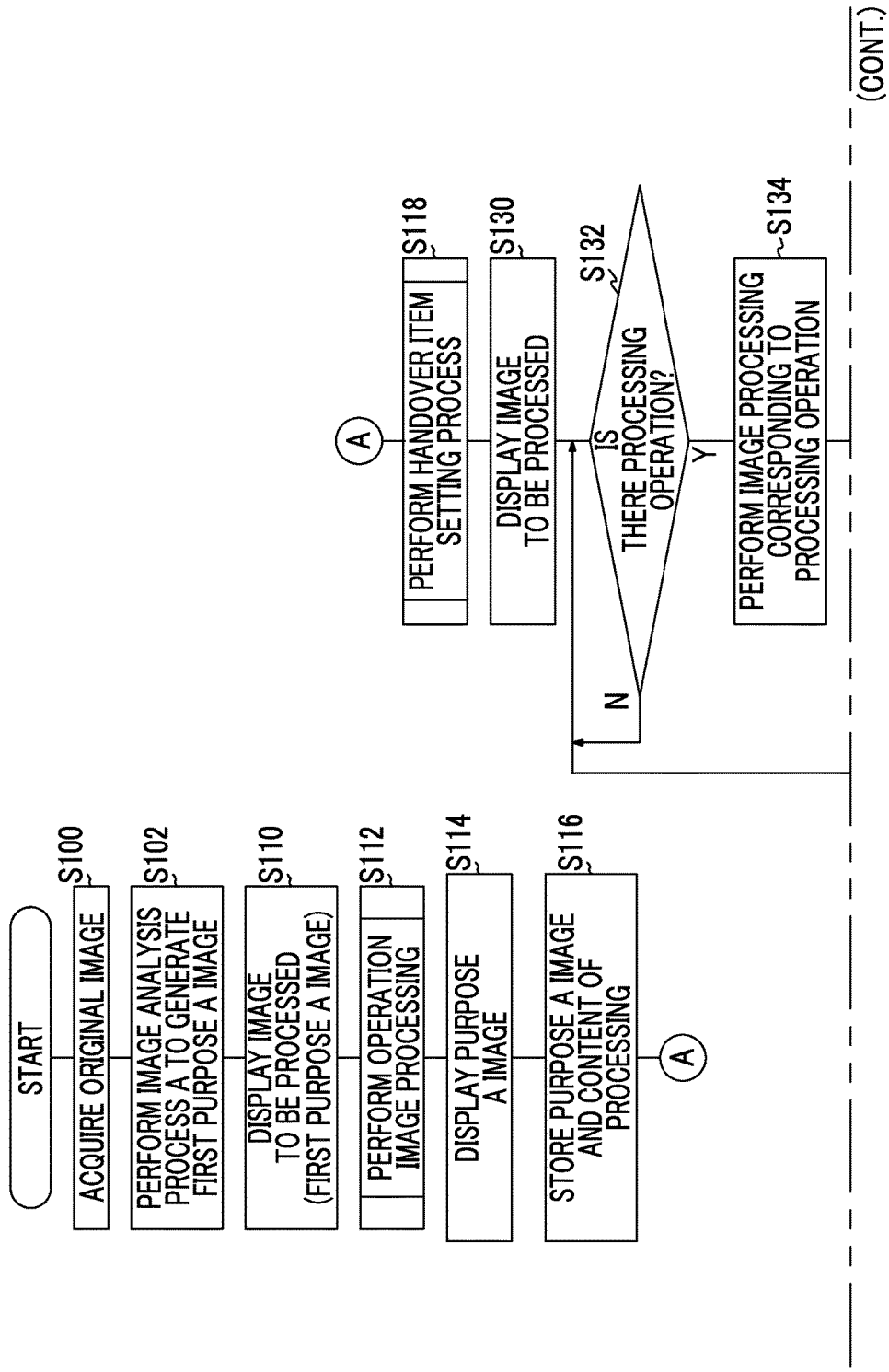
FIG. 23 is a flowchart of an example of image processing executed by a control unit of the console in the fifth embodiment.

FIG. 23 illustrates a flowchart of an example of image processing executed by the control unit 30 of the console 20 in this embodiment. In the image processing of this embodiment, since timings of image analysis process B and processing operation C are interchanged with those in the fourth embodiment, a process corresponding to step S137-6 of the image processing (see FIG. 21) of the fourth embodiment is performed before step S137-1, as illustrated in FIG. 23.

The control unit 30 of this embodiment completes the generation of the purpose A image in the same manner as in the fourth embodiment, performs setting of the handover item, and performs image processing corresponding to processing operation B to generate the first purpose B image from step S100 to step S136.

The control unit 30 of this embodiment proceeds to step S137-0 subsequent to step S136. In step S137-0, the control unit 30 performs image analysis process B on the first purpose B image to generate a second purpose B image.

A process of each of subsequent steps S137-1 to S137-5 is the same as the process of each of steps S137-1 to S137-5 of the image processing in the fourth embodiment.

The control unit 30 reflects processing operation C which is handover processing in the second purpose B image to generate the purpose B image, and displays the handover item on the display 34 together with the purpose B image. Further, the control unit 30 determines whether there is a change in the handover item, proceeds to step S138 in a case in which there is no change in the handover item, and generates an image according to the change and proceeds to step S138 in a case in which there is a change in the handover item.

Next steps S138 and S140 are also the same as those in the fourth embodiment. In step S138, the control unit 30 displays the purpose B image on the display 34 and causes the user to confirm the purpose B image. In step S140, the control unit 30 stores image information of the purpose B image and content of the image processing (including the image analysis process) performed for generation of the purpose B image in the storage unit of the control unit 30 in association with each other, and then, ends the image processing.

As described above, in the basic form of the present invention, the control unit 30 of the console 20 performs image processing corresponding to the processing operation of the user on the original image to generate image for one purpose (in the specific example, the purpose A image). The control unit 30 hands over processing operations for generating the image for one purpose as processing operations for generating the image for the other purpose (in the specific example, the purpose B image), reflects the handover processing operation, and performs the image processing. Further, the control unit 30 performs image processing corresponding to the processing operation performed by the user to generate the image for the other purpose, and generates the image for the other purpose.

Further, as described above, the control unit 30 of the console 20 in each embodiment acquires an original image of the radiographic image obtained from the radiographic image capturing device 12. The control unit 30 performs predetermined image analysis process A to generate the purpose A image, and performs image analysis process B to generate a purpose B image different from purpose A. The control unit 30 detects the processing operation performed on the purpose A image by the user, performs image processing corresponding to the processing operation to generate the purpose A image, and sets the corresponding processing operation in the definition of the predetermined handover conditions as a handover processing. The control unit 30 reflects the handover processing in the purpose B image. Further, the control unit 30 detects the processing operation performed on the purpose B image by the user and performs image processing according to the processing operation to generate a purpose B image.

Since the control unit 30 of the console 20 in each embodiment generates plural images having different purposes from one original image, it is possible to achieve reduction of an amount of exposure of the subject 18 and reduction of restraint time. Further, according to each embodiment, it is possible to achieve suppression of degradation of a bulb which is a radiation irradiation source of the radiation irradiation device 16 or reduction of imaging work of the radiological technician.

Further, since the control unit 30 of the console 20 of each embodiment can hand over the processing operation performed on the image for one purpose by the user, for the image for the other purpose, it is possible to reduce time and effort required for the processing operation image by image, and reduce a load of the processing operation of a user. According to each embodiment, since the same processing operation is handed over, a processing operation similarly performed on the images for both purposes do not require fine adjustment, and accordingly, the load of processing operation is reduced.

Further, since the control unit 30 of the console 20 in this embodiment automatically determines a processing operation requiring time and effort and sets the processing operation as the handover processing, a processing load of the user is reduced.

Further, since the control unit 30 of the console 20 in this embodiment displays the list of the handover items and the setting of the handover item is performed by the user, only a processing operation desired by the user can be set as the handover processing. Accordingly, according to each embodiment, setting of the processing operation not desired by the user as the handover processing is suppressed, and re-generation of the processing operation is suppressed.

Further, since the control unit 30 of the console 20 of each embodiment can define the type of processing operation and set the processing operation as the handover processing for each type, selection of the processing operation is easily performed when the user performs a setting of the processing operation. Further, an image processing load of the control unit 30 of the console 20 is reduced.

The case in which image for one purpose (purpose A image) is generated, and then, the image for the other purpose (purpose B image) is generated has been described, but the present invention is not limited.

For example, the control unit 30 may switch the processing operation to the other image according to, for example, an instruction of the user during generation (processing operation) of one image, and perform the processing operation on the other switched image, or may switch the display and the processing operations of both images to each other and perform the display and the processing operations. In this case, in a case in which a predetermined handover processing or a processing operation instructed as the handover processing by the user has been performed on the one image, the control unit 30 may reflect the predetermined handover processing or the processing operation in the other image. In a case in which both of the images are switched to each other and the display and the processing operations are performed as above, image processing for each image may be stored in association with both of the images or the original image and the image processing for each image may be stored in association with each other.

Further, for example, in a case in which the control unit 30 has simultaneously displayed both of the images and has performed the predetermined handover processing or the processing operation instructed as the handover processing by the user on any one of the image, the control unit 30 may reflect the predetermined handover processing or the processing operation in the other image and display the image.

While the case in which the control unit 30 of the console 20 performs the image processing has been described in each embodiment, another device may perform all or some of the image processing. For example, the radiographic image processing device 50 of the PACS 22 may perform the image processing.

Further, in each embodiment, the image information of the purpose A image and the content of the image processing (including the image analysis process) performed for generation of the purpose A image are stored in association with each other, and the image information of the purpose B image and the content of the image processing (including the image analysis process) performed for generation of the purpose B image are stored in association with each other. In addition thereto, the image information and the content may be stored in association with the original image. Further, the image information of the purpose A image and the image information of the purpose B image may not be stored, and the original image, the image processing (including the image analysis process) performed for generation of the purpose A image, and the image processing (including the image analysis process) performed for generation of the purpose B image may be stored in association with each other.

Further, while the case in which the image processing program is stored in the control unit 30 in advance has been described in each embodiment, the image processing program may be acquired from a recording medium such as a compact disk read only memory (CD-ROM) or a universal serial bus (USB) memory, an external device, or the like and stored.

Further, while the case in which two types of images are generated as plural images having different purposes has been described in each embodiment, three or more images may be generated.

Further, in this embodiment, the radiation of the present invention is not particularly limited, and X-rays, γ-rays, or the like can be applied.

Further, it is understood that configurations, operations, and the like of the radiographic image capturing system 10, the console 20, and the PACS 22 described in each embodiment are examples and can be changed according to circumstances without departing from the gist of the present invention.

The entire disclosure of Japanese Patent Application No. 2014-195139 is hereby incorporated herein by reference.

All documents, patent applications, and technical standards described herein are incorporated herein by references to the same extent as a case in which incorporation of the individual reference documents, patent applications, and technical standards by references are described specifically and individually.

What is claimed is:

1. An image processing device that generates a plurality of different images subjected to different image processes from an original image which is a radiographic image, the image processing device comprising:
    a first generation unit that receives a plurality of processing operations from a user of the image processing device and performs first image processes corresponding to the plurality of received processing operations on the original image to generate a first image; and
    a second generation unit that reflects handover processes, which are processes selected from among the plurality of received processing operations and are processes that are also performed for generating a second image, in the original image and then performs second image processes, which are different from the first image processes and are received from the user of the image processing device, to generate the second image, or performs the second image processes on the original image and then reflects the handover processings processes to generate the second image,
    wherein the plurality of received processing operations include parameter operations that require adjustment by the user of the image processing device.

2. The image processing device according to claim 1, further comprising:
    a handover processing setting unit that sets the selected processing operations among the plurality of processing operations as handover processes,
    wherein the second generation unit selects the processing operations set by the handover processing setting unit as the handover processes.

3. The image processing device according to claim 2, further comprising:
    a display control unit that displays the handover processes on a display unit,
    wherein the second generation unit includes an instruction reception unit that receives an instruction performed according to information indicating the handover processes displayed on the display unit by the display control unit, and reflects the handover processes according to the instruction received by the instruction reception unit in a handover destination.

4. The image processing device according to claim 3, wherein the display control unit displays only the processing operations selected as the handover processes by the second generation unit among the processing operations on the display unit.

5. The image processing device according to claim 3, wherein the display control unit displays, on the display unit, a display to set processing operations that are not selected by the second generation unit from among the processing operations, as the handover processes.

6. The image processing device according to claim 1, further comprising:
    an operation detection unit that detects at least one of operating time, an amount of operation, or a number of operations, according to which each processing operation is performed,
    wherein the second generation unit selects, as the handover processes, processing operations for which at least one of the operating time, the amount of operation, or the number of operations, detected by the operation detection unit is equal to or greater than a predetermined threshold value.

7. The image processing device according to claim 6, wherein, in a case in which there are a plurality of types of processing operations, the operation detection unit sums at least one of the detected operation time, the detected amount of operation, or the detected number of operations, for each type.

8. An image processing device comprising:
    a first generation unit that performs a first image analysis process on an original image, which is a radiographic image, to generate a first image;
    an image processing unit that receives a plurality of processing operations from a user of the image processing device and performs image processes corresponding to the plurality of received processing operations on the first image; and
    a second generation unit that performs a second image analysis process different from the first image analysis process on the original image to generate a second image, and reflects handover processes in the original image before generating the second image, or reflects the handover processes in the second image, the handover processes being processes that are selected from among the plurality of processing operations and processes that are also to be performed on the second image, wherein the plurality of processing operations include parameter operations that require adjustment by the user of the image processing device.

9. The image processing device according to claim 8, further comprising:

a handover processing setting unit that sets the selected processing operations among the plurality of processing operations as handover processes, wherein the second generation unit selects the processing operations set by the handover processing setting unit as the handover processes.

10. The image processing device according to claim 9, further comprising:

a display control unit that displays the handover processes on a display unit, wherein the second generation unit includes an instruction reception unit that receives an instruction performed according to information indicating the handover processes displayed on the display unit by the display control unit, and reflects the handover processes according to the instruction received by the instruction reception unit in a handover destination.

11. The image processing device according to claim 10, wherein the display control unit displays only the processing operations selected as the handover processes by the second generation unit among the processing operations on the display unit.

12. The image processing device according to claim 10, wherein the display control unit displays, on the display unit, a display to set processing operation operations that are not selected by the second generation unit among the processing operations, as the handover processes.

13. The image processing device according to claim 8, further comprising:

an operation detection unit that detects at least one of operating time, an amount of operation, or a number of operations, according to which each processing operation is performed, wherein the second generation unit selects, as the handover processes, processing operations for which at least one of the operating time, the amount of operation, or the number of operations, detected by the operation detection unit is equal to or greater than a predetermined threshold value.

14. The image processing device according to claim 13, wherein, in a case in which there are a plurality of types of processing operations, the operation detection unit sums at least one of the detected operation time, the detected amount of operation, or the detected number of operations, for each type.

15. An image processing device comprising:

a generation unit that acquires an original image which is a radiographic image and performs image processes having different processing conditions to generate a first image and a second image;

a first image processing unit that receives, from a user of the image processing device, a plurality of processing operations for the first image generated by the generation unit and performs image processes corresponding to the received plurality of processing operations on one image;

a reflecting unit that reflects handover processes that are selected from among the plurality of processing operations received by the first image processing unit and are processes that are also to be performed on the second image, in the second image; and a second image processing unit that receives, from the user of the image processing device, a plurality of processing operation for the second image, in which the handover processes are reflected by the reflecting unit, and performs second image processes corresponding to the received processing operations on the second image, wherein the plurality of processing operations include parameter operations that require adjustment by the user of the image processing device.

16. An image processing device comprising:

a generation unit that acquires an original image, which is a radiographic image, and performs image processes having different processing conditions to generate a first image and a second image;

a first image processing unit that receives, from a user of the image processing device, a plurality of processing operations for the first image generated by the generation unit and performs first image processes corresponding to the received processing operations on the first image;

a second image processing unit that receives, from the user of the image processing device, a plurality of processing operations for the second image and performs second image processes corresponding to the received plurality of processing operations on the second image; and a reflecting unit that reflects handover processes that are selected from among the plurality of processing operations received by the first image processing unit and are processes that are also to be performed on the second image, in the second image subjected to the second image processes by the second image processing unit, wherein the plurality of processing operations include parameter operations that require adjustment by the user of the image processing device.

17. An image processing device comprising:

a first generation unit that acquires an original image, which is a radiographic image, and performs a first image analysis process to generate a first image;

a first image processing unit that receives, from a user of the image processing device, a plurality of processing operations for the first image generated by the first generation unit and performs first image processes corresponding to the received plurality of processing operations on the first image;

a reflecting unit that reflects, in the original image, handover processes that are selected from among the plurality of processing operations received by the first image processing unit and are processes that are also to be performed on the original image;

a second generation unit that performs a second image analysis process on the original image in which the handover processes is reflected by the reflecting unit to generate a second image; and a second image processing unit that receives a plurality of processing operations for the second image and performs second image processes corresponding to the received plurality of processing operations on the second image, wherein the plurality of processing operations include parameter operations that require adjustment by the user of the image processing device.

18. An image processing device comprising:
a first generation unit that acquires an original image, which is a radiographic image, and performs a first image analysis process to generate a first image;
a first image processing unit that receives, from a user of the image processing device, a plurality of processing operations for the first image generated by the first generation unit and performs first image processes corresponding to the received plurality of processing operations on the first image;
a second image processing unit that receives, from the user of the image processing device, a plurality of processing operations for the second image and performs second image processes corresponding to the plurality of received processing operations on the original image;
a reflecting unit that selects handover processes that are selected from among plurality of the processing operations received by the first image processing unit and are processes that are also to be performed on the original image, and reflects the selected handover processes in the original image subjected to the second image processes by the second image processing unit; and
a second generation unit that performs a second image analysis process on the original image in which the handover processes is reflected by the reflecting unit, to generate the second image,
wherein the plurality of processing operations include parameter operations that require adjustment by the user of the image processing device.

19. An image processing device comprising:
a first generation unit that acquires an original image, which is a radiographic image, and performs first image processes to generate a first image;
a first image processing unit that receives, from a user of the image processing device, a plurality of processing operations for the first image generated by the first generation unit and performs first image processes corresponding to the received processing operations on the first image;
a second image processing unit that receives, from the user of the image processing device, a plurality of processing operations for the second image and performs second image processes corresponding to the received plurality of processing operations on the original image;
a second generation unit that performs a second image analysis process on the original image subjected to the second image processes by the second image processing unit to generate the second image; and
a reflecting unit that selects handover processes that are selected from among the processing operations received by the first image processing unit and are processes that are also to be performed on the second image, and reflects the selected handover processes in the second image generated by the second generation unit,
wherein the plurality of processing operations include parameter operations that require adjustment by the user of the image processing device.

20. An image processing system comprising:
the image processing device according to claim 1;
a display unit that displays an image subjected to image processing by the image processing device; and
an operation unit that performs a processing operation for the image processing device.

21. A non-transitory computer readable medium that stores an image processing program for causing a computer to function as each unit of the image processing device according to claim 1.

22. An image processing method of an image processing device that generates a plurality of different images subjected to different image processes from an original image, which is a radiographic image, the image processing method comprising:
causing a first generation unit to receive, from a user of the image processing device, a plurality of processing operations for the original image and perform first image processes corresponding to the plurality of received processing operations on the original image to generate a first image; and
causing a second generation unit to reflect handover processes in the original image, and then perform second image processes different from the first image processes to generate a second image or perform the second image processes on the original image, and then reflect the handover processes to generate the second image, the handover processes being processes selected from among the plurality of processing operations and processes that are also performed for generating the second image,
wherein the plurality of processing operations include parameter operations that require adjustment by the user of the image processing device.

23. An image processing method comprising:
causing a first generation unit to perform a first image analysis process on an original image, which is a radiographic image, to generate a first image;
causing an image processing unit to receive, from a user, a plurality of processing operations for the first image generated by the first generation unit, and perform image processes corresponding to the received plurality of processing operations on the first image; and
causing a second generation unit to perform a second image analysis process different from the first image analysis process on the original image to generate a second image, and to reflect handover processes in the original image before generating the second image, or to reflect the handover processes in the second image, the handover processes being processes that are selected from among the plurality of processing operations and processes that are also performed for the second image,
wherein the plurality of processing operations include parameter operations that require adjustment by the user of the image processing device.

* * * * *